US010992350B2

(12) United States Patent
John Wilson et al.

(10) Patent No.: US 10,992,350 B2
(45) Date of Patent: *Apr. 27, 2021

(54) CROSS-SUB-BAND QUASI CO-LOCATION SIGNALING

(71) Applicant: QUALCOMM INCORPORATED, San Diego, CA (US)

(72) Inventors: Makesh Pravin John Wilson, San Diego, CA (US); Tao Luo, San Diego, CA (US); Sony Akkarakaran, Poway, CA (US); Rahul Malik, San Diego, CA (US); Kaushik Chakraborty, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/733,500

(22) Filed: Jan. 3, 2020

(65) Prior Publication Data

US 2020/0220584 A1 Jul. 9, 2020

Related U.S. Application Data

(63) Continuation of application No. 15/975,995, filed on May 10, 2018, now Pat. No. 10,554,262.

(Continued)

(51) Int. Cl.
*H04J 11/00* (2006.01)
*H04B 7/0408* (2017.01)
(Continued)

(52) U.S. Cl.
CPC ......... *H04B 7/0408* (2013.01); *H04B 7/0413* (2013.01); *H04B 7/0617* (2013.01);
(Continued)

(58) Field of Classification Search
USPC ........................................................ 370/329
See application file for complete search history.

(56) References Cited

U.S. PATENT DOCUMENTS 9,924,504 B2 3/2018 Barbieri et al.
10,554,262 B2 * 2/2020 John Wilson ........ H04B 7/0408
(Continued)

FOREIGN PATENT DOCUMENTS

CN 105794132 A 7/2016
CN 106559879 A 4/2017
(Continued)

OTHER PUBLICATIONS

Taiwan Search Report—TW107116075—TIPO—dated Jun. 19, 2020.

(Continued)

*Primary Examiner* — Eva Y Puente
(74) *Attorney, Agent, or Firm* — Liem T. Do

(57) ABSTRACT

Methods, systems, and devices for wireless communication are described. A base station may configure a first sub-band and a second sub-band of a system bandwidth for communication with a user equipment (UE). The base station may determine a spatial quasi co-location (QCL) relationship between the first sub-band and the second sub-band and may transmit signaling to the UE that indicates the determined spatial QCL relationship. Upon receiving the signaling, the UE may derive, based on the indicated spatial QCL relationship, spatial parameters (e.g., beam width, pointing angle, etc.) for communication with the base station via the second sub-band. The spatial parameters may be derived based on spatial parameters used for reception of a downlink transmission from the base station via the first sub-band.

(Continued)

Subsequently, the UE may communicate with the base station via the second sub-band using the derived spatial parameters.

29 Claims, 20 Drawing Sheets

Related U.S. Application Data

(60) Provisional application No. 62/505,802, filed on May 12, 2017.

(51) Int. Cl.
*H04B 7/0413* (2017.01)
*H04W 72/04* (2009.01)
*H04B 7/08* (2006.01)
*H04B 7/06* (2006.01)
*H04L 5/00* (2006.01)

(52) U.S. Cl.
CPC .......... *H04B 7/086* (2013.01); *H04L 5/0048* (2013.01); *H04L 5/0053* (2013.01); *H04W 72/042* (2013.01); *H04W 72/046* (2013.01); *H04W 72/0413* (2013.01); *H04J 11/00* (2013.01)

(56) References Cited

U.S. PATENT DOCUMENTS

| | | | |
|---|---|---|---|
| 2009/0262696 A1* | 10/2009 | Wei .................. | H04L 5/0044 370/329 |
| 2016/0374098 A1 | 12/2016 | Jöngren et al. | |
| 2018/0049047 A1 | 2/2018 | Lin et al. | |
| 2018/0219606 A1 | 8/2018 | Ng et al. | |
| 2018/0242327 A1 | 8/2018 | Frenne et al. | |
| 2018/0278314 A1* | 9/2018 | Nam .................. | H04B 7/0626 |
| 2018/0323855 A1 | 11/2018 | Noh et al. | |
| 2018/0331727 A1 | 11/2018 | John et al. | |
| 2018/0331860 A1 | 11/2018 | Bergman et al. | |

FOREIGN PATENT DOCUMENTS

| | | |
|---|---|---|
| JP | 2015532050 A | 11/2015 |
| JP | 2016510528 A | 4/2016 |
| KR | 20150035592 A | 4/2015 |
| KR | 20150058171 A | 5/2015 |
| KR | 20150065667 A | 6/2015 |
| KR | 20150067132 A | 6/2015 |
| TW | 201707402 A | 2/2017 |
| TW | 201709706 A | 3/2017 |
| WO | WO-2014112938 A1 | 7/2014 |
| WO | WO-2015054263 A1 | 4/2015 |

OTHER PUBLICATIONS

Catt: "Discussion on QCL for NR", 3GPP Draft; R1-1708888, 3rd Generation Partnership Project (3GPP), Mobile Competence Centre; 650, Route Des Luciales; F-06921 Sophia-Antipolis Cedex; France, vol. RAN WG1, No. Hangzhou, China: May 15, 2017-May 19, 2017, May 10, 2017 (May 10, 2017), 4 Pages, XP051263439, Retrieved from the Internet: URL: http://www.3gpp.org/ftp/tsg_ran/WG1_RL1/TSGR1_89/Docs/ [retrieved on May 10, 2017].
Ericsson: "On QCL", 3GPP Draft; R1-1708710, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017 May 6, 2017, XP051262607, Retrieved from the Internet: URL:http://www.3gpp.org/ftp/tsg_ran/WG1_RL1/TSGR1_89/Docs/ [retrieved on May 6, 2017], 6 pages, section 6.
International Search Report and Written Opinion—PCT/US2018/032222—ISA/EPO—dated Sep. 4, 2018.
Nokia et al., "On QCL Framework and Configurations in NR", 3GPP Draft, R1-1703184, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 12, 2017 (Feb. 12, 2017), XP051210320, 3 Pages, Retrieved from the Internet: URL:http://www.3gpp.org/ftp/Meetings_3GPP_SYNC/RAN1/Docs/ [retrieved on Feb. 12, 2017].
Ericsson: "On QCL", 3GPP Draft, R1-1709710, 3rd Generation Partnership Project (3GPP), Mobile Competence Centre, 650, Route Des Lucioles, F-06921 Sophia-Antipolis Cedex, France, vol. RAN WG1, No. angzhou, China, 20170515-20170519, May 6, 2017, (May 6, 2017), XP051262607, 5 Pages, Retrieved from the internet: URL: http://www.3gpp.org/ftp/tsg_ran/WG1_RL1/TSGR1_89/Docs/.
Intel Corporation: "Cross-Carrier QCL for NR", 3GPP Draft, 3GPP TSG RAN WG1 Meeting #88bis, R1-1704738, Spokane, USA, Apr. 3-7, 2017, XP051242876, 2 Pages, Retrieved from the Internet: URL: http://www.3gpp.org/ftp/Meetings_3GPP_SYNC/RAN1/Docs/. [retrieved on Apr. 2, 2017].
Nokia: "Summary of AI 8.1.2.4.5 QCL", R1-1706797, 3GPP TSG RAN WG1 88bis, Spokane, USA, Apr. 3-7, 2017, 10 pages.

* cited by examiner

CROSS-SUB-BAND QUASI CO-LOCATION SIGNALING

CROSS REFERENCES

The present application for patent is a Continuation of U.S. patent application Ser. No. 15/975,995 by John Wilson, et al., entitled, "Cross-Sub-Band Quasi Co-Location Signaling" filed May 10, 2018, which claims the benefit of U.S. Provisional Patent Application No. 62/505,802 by John Wilson et al., entitled "Cross-Sub-Band Quasi Co-Location Signaling," filed May 12, 2017, assigned to the assignee hereof, and expressly incorporated by reference in its entirety.

BACKGROUND

The following relates generally to wireless communication, and more specifically to cross-sub-band quasi co-location (QCL) signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless multiple-access communications systems, devices may transmit and receive communications over multiple antennas. For example, a device may transmit parallel data streams over respective antennas in order to increase throughput (e.g., as opposed to transmitting the data streams sequentially over the same antenna). Additionally or alternatively, a device may transmit a given data stream over multiple antennas simultaneously (e.g., to increase the range of the transmissions). In some cases, the use of multiple antennas may be based on one or more antenna ports. An antenna port is a logical entity used to map data streams to antennas. A given antenna port may drive transmissions from one or more antennas (e.g., and resolve signal components received over one or more antennas).

Each antenna port may be associated with a reference signal (e.g., which may allow the receiver to distinguish data streams associated with the different antenna ports in a received transmission). Some antenna ports may be referred to as quasi co-located, meaning that the spatial parameters of the channel over which a symbol on one antenna port is conveyed can be inferred from the spatial parameters of the channel over which a symbol on another antenna port is conveyed. This implicit relationship between antenna ports may improve the reliability of successfully decoding a transmission. However, such an implicit relationship may not be discernible in all situations. For example, two devices may communicate over multiple sub-bands (or carriers) simultaneously. Because these sub-bands may or may not be associated with the same set of antennas at the transmitting device (e.g., a base station), a receiving device (e.g., a UE) may not be able to assume any implicit relationship between antenna ports of the different carriers (e.g., even if these antenna ports would be quasi co-located if they were transmitted over the same carrier).

SUMMARY

The described techniques generally relate to cross-sub-band quasi co-location (QCL) signaling. Specifically, a base station may signal a spatial QCL relationship between sub-bands to a user equipment (UE). As an example, a base station may communicate with a UE over multiple sub-bands (e.g., different portions of a system bandwidth) simultaneously. Each sub-band may be associated with a different antenna array at the base station or with the same antenna array. Because the UE may not know which antenna configuration the base station employs for a given transmission, the UE may not be able to assume any spatial QCL relationship across sub-bands. In accordance with the described techniques, a base station may signal (e.g., explicitly or otherwise) a spatial QCL relationship between multiple sub-bands (or multiple carriers) and, in some cases, which spatial parameters (e.g., beam width, pointing angle, beam direction, etc.) are quasi co-located. The UE may determine, for example, from a reference signal received over a first sub-band, the indicated spatial parameters for the second sub-band based on the signaling. Accordingly, the UE may form a transmit beam or receive beam (based on the spatial parameters of the reference signal received over the first sub-band) to communicate with the base station over the second sub-band.

A method of wireless communication is described. The method may include receiving signaling from a base station that indicates a spatial QCL relationship between a first sub-band and a second sub-band of a system bandwidth, deriving, based at least in part on the spatial QCL relationship, spatial parameters for communication with the base station via the second sub-band based at least in part on spatial parameters used for reception of a downlink transmission from the base station via the first sub-band, and communicating with the base station via the second sub-band using the derived spatial parameters.

An apparatus for wireless communication is described. The apparatus may include means for receiving signaling from a base station that indicates a spatial QCL relationship between a first sub-band and a second sub-band of a system bandwidth, means for deriving, based at least in part on the spatial QCL relationship, spatial parameters for communication with the base station via the second sub-band based at least in part on spatial parameters used for reception of a downlink transmission from the base station via the first sub-band, and means for communicating with the base station via the second sub-band using the derived spatial parameters.

Another apparatus for wireless communication is described. The apparatus may include a processor, memory in electronic communication with the processor, and instructions stored in the memory. The instructions may be operable to cause the processor to receive signaling from a base station that indicates a spatial QCL relationship between a first sub-band and a second sub-band of a system bandwidth, derive, based at least in part on the spatial QCL relationship, spatial parameters for communication with the base station via the second sub-band based at least in part on spatial parameters used for reception of a downlink transmission from the base station via the first sub-band, and communicate with the base station via the second sub-band using the derived spatial parameters.

A non-transitory computer readable medium for wireless communication is described. The non-transitory computer-readable medium may include instructions operable to cause a processor to receive signaling from a base station that indicates a spatial QCL relationship between a first sub-band and a second sub-band of a system bandwidth, derive, based at least in part on the spatial QCL relationship, spatial parameters for communication with the base station via the second sub-band based at least in part on spatial parameters used for reception of a downlink transmission from the base station via the first sub-band, and communicate with the base station via the second sub-band using the derived spatial parameters.

Some examples of the method, apparatus, and non-transitory computer-readable medium described above may further include processes, features, means, or instructions for identifying a transmission beam for communicating with the base station via the second sub-band based on the spatial QCL relationship wherein the communicating comprises transmitting uplink control information on the second sub-band using the transmission beam.

In some examples of the method, apparatus, and non-transitory computer-readable medium described above, deriving spatial parameters comprises: deriving spatial parameters for the transmission beam, the derived spatial parameters being for functions that may be reciprocal of functions defined by the spatial parameters used for reception of the downlink transmission.

Some examples of the method, apparatus, and non-transitory computer-readable medium described above may further include processes, features, means, or instructions for identifying a set of analog beamforming weights associated with the spatial parameters used for reception of the downlink transmission. Some examples of the method, apparatus, and non-transitory computer-readable medium described above may further include processes, features, means, or instructions for adjusting the set of analog beamforming weights for use with the transmission beam based at least in part on the spatial QCL relationship.

Some examples of the method, apparatus, and non-transitory computer-readable medium described above may further include processes, features, means, or instructions for identifying a reception beam for communicating with the base station via the second sub-band based on the spatial QCL relationship, wherein the communicating comprises receiving a second downlink transmission on the second sub-band using the reception beam.

Some examples of the method, apparatus, and non-transitory computer-readable medium described above may further include processes, features, means, or instructions for identifying a set of analog beamforming weights associated with the spatial parameters used for reception of the downlink transmission, wherein the downlink transmission may be a first downlink transmission. Some examples of the method, apparatus, and non-transitory computer-readable medium described above may further include processes, features, means, or instructions for adjusting the set of analog beamforming weights for use with the reception beam based at least in part on the spatial QCL relationship.

In some examples of the method, apparatus, and non-transitory computer-readable medium described above, the first downlink transmission includes a channel state information reference signal (CSI-RS) and the second downlink transmission includes a physical downlink shared channel (PDSCH) demodulation reference signal (DMRS).

Some examples of the method, apparatus, and non-transitory computer-readable medium described above may further include processes, features, means, or instructions for applying the spatial QCL relationship as a reciprocal QCL relationship across the first sub-band and the second sub-band, wherein the reciprocal QCL relationship may be associated with spatial parameters used for reception of one or more downlink signals received via the downlink transmission on the first sub-band and transmission of one or more uplink signals transmitted on the second sub-band.

In some examples of the method, apparatus, and non-transitory computer-readable medium described above, the one or more downlink signals comprise a physical downlink control channel (PDCCH) DMRS, a PDSCH DMRS, a CSI-RS, a synchronization signal, or any combination thereof, and wherein the one or more uplink signals comprise a physical uplink control channel (PUCCH) DMRS, a physical uplink shared channel (PUSCH) DMRS, a sounding reference signal (SRS), a random access channel (RACH), or any combination thereof.

Some examples of the method, apparatus, and non-transitory computer-readable medium described above may further include processes, features, means, or instructions for applying the spatial QCL relationship as a QCL relationship across the first sub-band and the second sub-band, wherein the QCL relationship may be associated with spatial parameters used for reception of a first downlink signal received via the downlink transmission on the first sub-band and reception of a second downlink signal received on the second sub-band. In some examples of the method, apparatus, and non-transitory computer-readable medium described above, the first downlink signal and the second downlink signal comprise a PDCCH DMRS, a PDSCH DMRS, a CSI-RS, a synchronization signal, or any combination thereof.

Some examples of the method, apparatus, and non-transitory computer-readable medium described above may further include processes, features, means, or instructions for receiving the signaling using radio resource control (RRC) messaging, a medium access control (MAC) control element, downlink control information (DCI), or a combination thereof.

In some examples of the method, apparatus, and non-transitory computer-readable medium described above, the first sub-band comprises a first carrier and the second sub-band comprises a second carrier. In some examples of the method, apparatus, and non-transitory computer-readable medium described above, the derived spatial parameters comprise a pointing angle, a beam width, a beam direction, or a combination thereof.

A method of wireless communication is described. The method may include configuring a first sub-band and a second sub-band of a system bandwidth for communication with a UE, determining a spatial QCL relationship between the first sub-band and the second sub-band, and transmitting signaling to the UE that indicates the determined spatial QCL relationship.

An apparatus for wireless communication is described. The apparatus may include means for configuring a first sub-band and a second sub-band of a system bandwidth for communication with a UE, means for determining a spatial QCL relationship between the first sub-band and the second sub-band, and means for transmitting signaling to the UE that indicates the determined spatial QCL relationship.

Another apparatus for wireless communication is described. The apparatus may include a processor, memory in electronic communication with the processor, and instructions stored in the memory. The instructions may be operable to cause the processor to configure a first sub-band and a second sub-band of a system bandwidth for communication with a UE, determine a spatial QCL relationship between the first sub-band and the second sub-band, and transmit signaling to the UE that indicates the determined spatial QCL relationship.

A non-transitory computer readable medium for wireless communication is described. The non-transitory computer-readable medium may include instructions operable to cause a processor to configure a first sub-band and a second sub-band of a system bandwidth for communication with a UE, determine a spatial QCL relationship between the first sub-band and the second sub-band, and transmit signaling to the UE that indicates the determined spatial QCL relationship.

Some examples of the method, apparatus, and non-transitory computer-readable medium described above may further include processes, features, means, or instructions for transmitting a downlink transmission to the UE on the first sub-band, wherein the spatial QCL relationship allows the UE to derive spatial parameters for transmission of uplink control information on the second sub-band based at least in part on spatial parameters used for reception of the downlink transmission on the first sub-band. Some examples of the method, apparatus, and non-transitory computer-readable medium described above may further include processes, features, means, or instructions for receiving the uplink control information on the second sub-band.

Some examples of the method, apparatus, and non-transitory computer-readable medium described above may further include processes, features, means, or instructions for transmitting a first downlink transmission to the UE on the first sub-band, wherein the spatial QCL relationship allows the UE to derive spatial parameters for reception of a second downlink transmission on the second sub-band based at least in part on spatial parameters used for reception of the first downlink transmission on the first sub-band. Some examples of the method, apparatus, and non-transitory computer-readable medium described above may further include processes, features, means, or instructions for transmitting the second downlink transmission on the second sub-band. In some examples of the method, apparatus, and non-transitory computer-readable medium described above, the first downlink transmission includes a CSI-RS and the second downlink transmission includes a PDSCH DMRS.

In some examples of the method, apparatus, and non-transitory computer-readable medium described above, determining the spatial QCL relationship between the first sub-band and the second sub-band comprises: determining a reciprocal QCL relationship across the first sub-band and the second sub-band, wherein the reciprocal QCL relationship may be associated with spatial parameters used for reception by the UE of one or more downlink signals transmitted on the first sub-band and transmission by the UE of one or more uplink signals transmitted on the second sub-band.

In some examples of the method, apparatus, and non-transitory computer-readable medium described above, the one or more downlink signals comprise a PDCCH DMRS, a PDSCH DMRS, a CSI-RS, a synchronization signal, or any combination thereof, and wherein the one or more uplink signals comprise a PUCCH DMRS, a PUSCH DMRS, a SRS, a RACH, or any combination thereof. In some examples of the method, apparatus, and non-transitory computer-readable medium described above, determining the spatial QCL relationship between the first sub-band and the second sub-band comprises: determining a QCL relationship across the first sub-band and the second sub-band, wherein the QCL relationship may be associated with spatial parameters for reception by the UE of a first downlink signal transmitted on the first sub-band and reception by the UE of a second downlink signal transmitted on the second sub-band.

In some examples of the method, apparatus, and non-transitory computer-readable medium described above, the first downlink signal and the second downlink signal comprise a PDCCH DMRS, a PDSCH DMRS, a CSI-RS, a synchronization signal, or any combination thereof. In some examples of the method, apparatus, and non-transitory computer-readable medium described above, transmitting the signaling comprises: transmitting the signaling using RRC messaging, a MAC control element, DCI, or a combination thereof.

In some examples of the method, apparatus, and non-transitory computer-readable medium described above, the first sub-band comprises a first carrier and the second sub-band comprises a second carrier. In some examples of the method, apparatus, and non-transitory computer-readable medium described above, the spatial QCL relationship may be associated with spatial parameters comprising a pointing angle, a beam width, a beam direction, or a combination thereof.

DETAILED DESCRIPTION

In some wireless communication systems, devices may be able to communicate over multiple portions of a system bandwidth at the same time. Such a configuration may improve throughput for the communications or otherwise benefit the system. However, because transmissions over the different bandwidth portions may experience different paths (e.g., may be transmitted from different antennas, may experience different degrees of pathloss, may be received over different antennas, etc.), a receiving device may have to process the transmissions independently (e.g., may not be able to exploit signal processing of an antenna port on one sub-band to facilitate processing of a quasi co-located antenna port on another sub-band). In accordance with various aspects of the present disclosure, a base station may signal a relationship between the two portions of bandwidth, which may be referred to as carriers, sub-bands, or bandwidth parts (BWP) herein, to allow a user equipment (UE) to transmit (or receive) a second signal over a second portion based on processing of a first signal received over the first portion of the bandwidth.

Aspects of the disclosure are initially described in the context of a wireless communications system. Aspects of the disclosure are then illustrated in the context of transmission diagrams and process flows. Aspects of the disclosure are further illustrated by and described with reference to apparatus diagrams, system diagrams, and flowcharts that relate to cross-sub-band quasi co-location (QCL) signaling.

Figure 1:
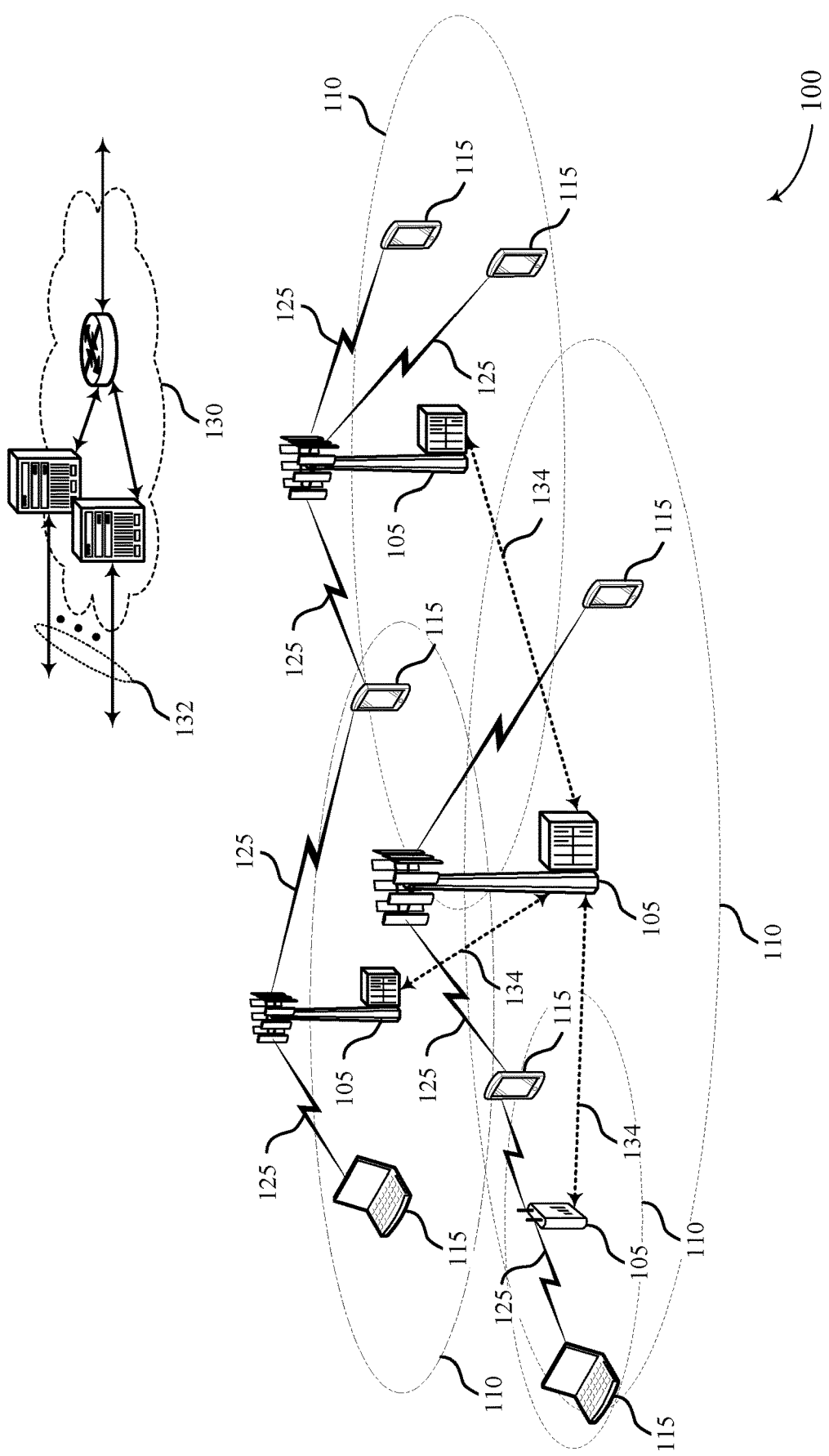
FIG. 1 illustrates an example of a wireless communications system in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. A UE 115 may be operable to communicate with a base station 105 over multiple sub-bands. In some cases, spatial parameters associated with a beam of one such sub-band may be estimated based on spatial parameters associated with the beam of another sub-band. In such cases, antenna ports of the beams (e.g., or sub-bands) may be referred to as quasi co-located with one another. However, there may be some restrictions on implicit QCL assumptions across sub-bands. Accordingly, various aspects of the present disclosure allow for the signaling of a QCL relationship (e.g., including a QCL type) between a first sub-band (e.g., a first carrier or BWP) and a second sub-band (e.g., a second carrier or BWP).

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, S2, etc.). Base stations 105 may communicate with one another over backhaul links 134 (e.g., X1, X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105 or next generation NodeBs (gNBs) 105.

A base station 105 may be connected by an S1 interface to the core network 130. The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and a network device such as a base station 105, or core network 130 supporting radio bearers for user plane data. At the physical (PHY) layer, transport channels may be mapped to physical channels.

A shared radio frequency spectrum band may be utilized in an NR shared spectrum system. For example, an NR shared spectrum may utilize any combination of licensed, shared, and unlicensed spectrums, among others. The flexibility of symbol duration and subcarrier spacing in a NR system may allow for the use of multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communications system 100 may support operation across multiple carriers or sub-bands (or BWPs). In aspects, the terms carrier, sub-band, and BWP may refer to any suitable portion of a frequency spectrum over which signals are transmitted. For example, two carriers may each occupy 400 MHz in system bandwidth. Each 400 MHz carrier may contain multiple sub-bands (e.g., four 100 MHz sub-bands). It is to be understood that these examples are not restrictive; the carriers may occupy any suitable bandwidth and contain any suitable number of sub-bands. Further, different carriers may span different bandwidths and/or contain different numbers of sub-bands. In some cases, a sub-band may exhibit aspects of a component carrier (CC) as used in a wideband deployment. For example, parallel data streams may be transmitted over respective sub-bands, and these data streams may be aggregated to form a received signal. In some cases, UE 115 may transmit (e.g., or receive) a signal over four 100 MHz sub-bands and base station 105 may receive (e.g., or transmit) the signal over a single 400 MHz carrier. Alternatively, both the UE 115 and base station 105 may use sub-bands, or both may use carriers and/or BWPs. In some cases, the base station 105 may use multiple sub-bands while the UE 115 uses a single aggregated carrier. Accordingly, in aspects of the present disclosure, a QCL relationship between sub-bands may be specified (e.g., using analogous techniques to those used for specifying QCL relationships between carriers). BWPs may comprise a portion of the frequency spectrum. Further, a BWP may be switched dynamically such that a UE 115 may not need to transmit or receive outside of the frequency range of the BWP, with the exception of a measurement gap. In some cases, BWPs may be configured using RRC signaling and may be switched using DCI messaging. A BWP may comprise a portion of a sub-band or carrier. Thus, while in some examples the terms carrier, sub-band, and BWP may refer to distinct concepts (e.g., distinct frequency divisions), the terms may be used interchangeably (e.g., in that the various techniques herein described in terms of sub-bands may also apply interchangeably to carriers and BWPs).

Wireless communications system 100 may operate in an ultra-high frequency (UHF) region using frequency bands from 700 MHz to 2600 MHz, although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 25 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). Such steering may be achieved by combining elements in an antenna array in such a way that particular angles of the transmitted signal(s) experience constructive interference while other angles experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, a base station 105 may have an antenna array (e.g., or antenna panel) with a number of rows and columns of antennas that the base station 105 may use for beamforming in its communication with a UE 115. Signals may be transmitted multiple times in different directions (e.g., each transmission may be beamformed differently). A mmW receiver (e.g., a UE 115) may try multiple beams (e.g., antenna subarrays) while receiving the synchronization signals as described with reference to FIG. 2.

In some cases, the antennas of a base station 105 or UE 115 may be located within one or more antenna arrays, which may support beamforming for MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some examples of wireless communications system 100 (e.g., in a multi-carrier mmW system), multiple carriers (e.g., or multiple sub-bands or multiple BWPs) may share the same antenna panel(s). Accordingly, if the beam for a given carrier points in a certain direction, all the carriers (e.g., or sub-bands or BWPs) sharing the antenna panel may be constrained to point in the same direction (e.g., accounting for minor angle changes over the bandwidth if the sub-bands themselves span a bandwidth that is significantly smaller than the carrier frequency). Alternatively, each carrier (e.g., or subset of carriers, sub-band, subset of sub-bands, BWPs, etc.) may use different antenna panels (e.g., such that different carriers may point in different directions simultaneously).

In some aspects, wireless communications system 100 may be configured to support communications over quasi co-located antenna ports. Generally, two or more antenna ports may be considered quasi co-located if the spatial parameters of the channel over which a symbol on one antenna port is conveyed can be inferred from the spatial parameters of the channel over which a symbol on the other antenna port is conveyed. In some aspects, the spatial parameters may include one or more (alone or in any combination) of a delay spread, a Doppler spread, a Doppler shift, an average gain, an average delay, an angle of departure, an angle of arrival, etc.

Within a given subframe, a UE 115 may be able to assume QCL relationships between certain antenna ports. For example, a UE 115 configured in transmission mode 1 through 9 for a serving cell may assume antenna ports 0-3, 5, and 7-22 of the serving cell are quasi co-located with respect to Doppler shift, Doppler spread, average delay, and delay spread. However, in some cases, such implicit assumptions may be prohibited. For example, because of the different types of potential implementations at a base station 105 (e.g., multiple carriers on the same antenna panel, one carrier per panel, etc.), a UE 115 may not be able to assume any relationship between QCL spatial parameters of antenna ports across different carriers (e.g., or sub-bands or BWPs). In various examples, a UE 115 may benefit from using QCL spatial parameters of a first antenna port associated with a first sub-band (e.g., a downlink sub-band) to estimate spatial parameters of another antenna port associated with a second sub-band (e.g., another downlink sub-band or an uplink sub-band). In such cases, a base station 105 may provide, to the UE 115, an indication of the spatial relationship (or QCL relationship) between multiple sub-bands.

Figure 2:
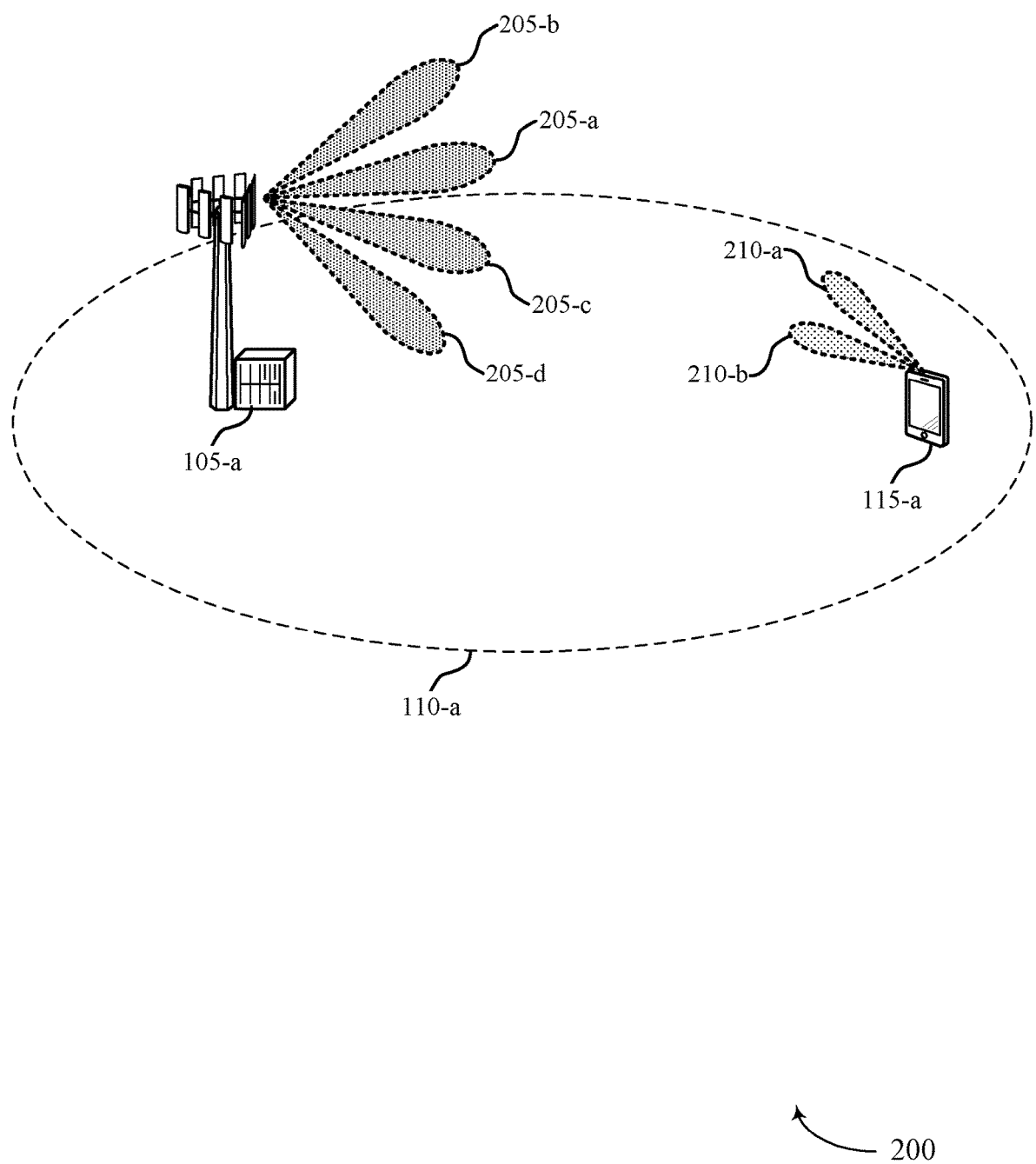
FIG. 2 illustrates an example of a wireless communications system in accordance with aspects of the present disclosure.

FIG. 2 illustrates an example of a wireless communications system 200 in accordance with various aspects of the present disclosure. Wireless communications system 200 includes a base station 105-a and UE 115-a, each of which may be an example of the corresponding device described with reference to FIG. 1. Wireless communications system 200 may operate in frequency ranges that are associated with beamformed transmissions between base station 105-a and UE 115-a. For example, wireless communications system 200 may operate using mmW frequency ranges. As a result, signal processing techniques such as beamforming may be used to improve communication quality. Wireless communications system 200 may support signaling of cross-sub-band (or cross-carrier or cross-BWP) spatial QCL relationships to enable efficient communications between base station 105-a and UE 115-a.

By way of example, base station 105-a may contain multiple antennas. In some cases, each antenna may transmit a phase-shifted version of a signal such that the phase-shifted versions constructively interfere in certain regions and destructively interfere in others (e.g., in order to steer the beams in a desired direction and/or to control the width of the beam). The region in which strong constructive interference occurs may in some cases be referred to as a beam. Weights may be applied to the various phase-shifted versions (e.g., to achieve amplitude modulation). Such techniques (or similar techniques) may serve to increase the coverage area 110-a of the base station 105-a or otherwise benefit the wireless communications system 200.

Transmit beams 205 represent examples of beams over which information may be transmitted (e.g., using one or more carriers). Accordingly, each transmit beam 205 may be directed from base station 105-a toward a different region of the coverage area 110-a, and in some cases, two or more beams may overlap. Multiple transmit beams 205 may be transmitted simultaneously or sequentially. In either case, UE 115-a may be capable of receiving one or more transmit beams 205 of base station 105-a via a receive beam 210.

In one example, UE 115-a may form receive beams 210-a, 210-b. Similar to base station 105-a, UE 115-a may contain multiple antennas. In some cases, the receive beams 210-a, 210-b may each receive signals sent over transmit beam 205-a and transmit beam 205-b. Because the signal transmitted over transmit beam 205-a experiences different path losses and phase shifts on its way to the respective antennas of UE 115-a, and because each receive beam 210-a, 210-b weights antennas (e.g., or antenna ports) of UE 115-a differently, the signal received over receive beam 210-a may have different signal properties from the signal received over receive beam 210-b. Similar differences in signal quality may be observed for the signal transmitted over transmit beam 205-b. UE 115-a may select a transmit beam 205 and a receive beam 210 based on the received signal quality. The transmit beam 205 and corresponding receive beam 210 may be referred to as a beam pair.

It is to be understood that, while the examples above are described in terms of downlink transmissions (e.g., such that the transmit beams 205 originate at the base station 105-a), analogous considerations for uplink transmissions are included in the scope of the present disclosure. For example, UE 115-a may transmit signals over multiple UE transmit beams (not shown), which are received at base station 105-*a* over one or more base station receive beams.

In some cases, base station 105-*a* may signal a spatial QCL relationship between sub-bands, carriers, or BWPs used to communicate with UE 115-*a*. Each sub-band may be associated with a different antenna array at base station 105-*a* or with the same antenna array. In some examples, UE 115-*a* may use the received spatial QCL relationship signaled by base station 105-*a* to determine appropriate spatial parameters for sending transmissions to, or receiving transmissions from, base station 105-*a*. As a result, the signaling from base station 105-*a* may enable UE 115-*a* to efficiently identify spatial parameters for communication based on the transmitted signaling. For example, a transmission configuration indicator may be signaled by base station 105-*a*, which may indicate a QCL relationship between downlink signals (e.g., reference signals) associated with different antenna ports of base station 105-*a*. In such cases, UE 115-*a* may select a receive beam 210 or a UE transmission beam based on the spatial QCL relationship. Additionally, UE 115-*a* may adjust a set of beamforming weights for transmitting and receiving signaling based on the spatial QCL relationship. The techniques described herein may thus enhance communication efficiency by accounting for differences in spatial parameters between different carriers, sub-bands, or BWPs.

Figure 3:
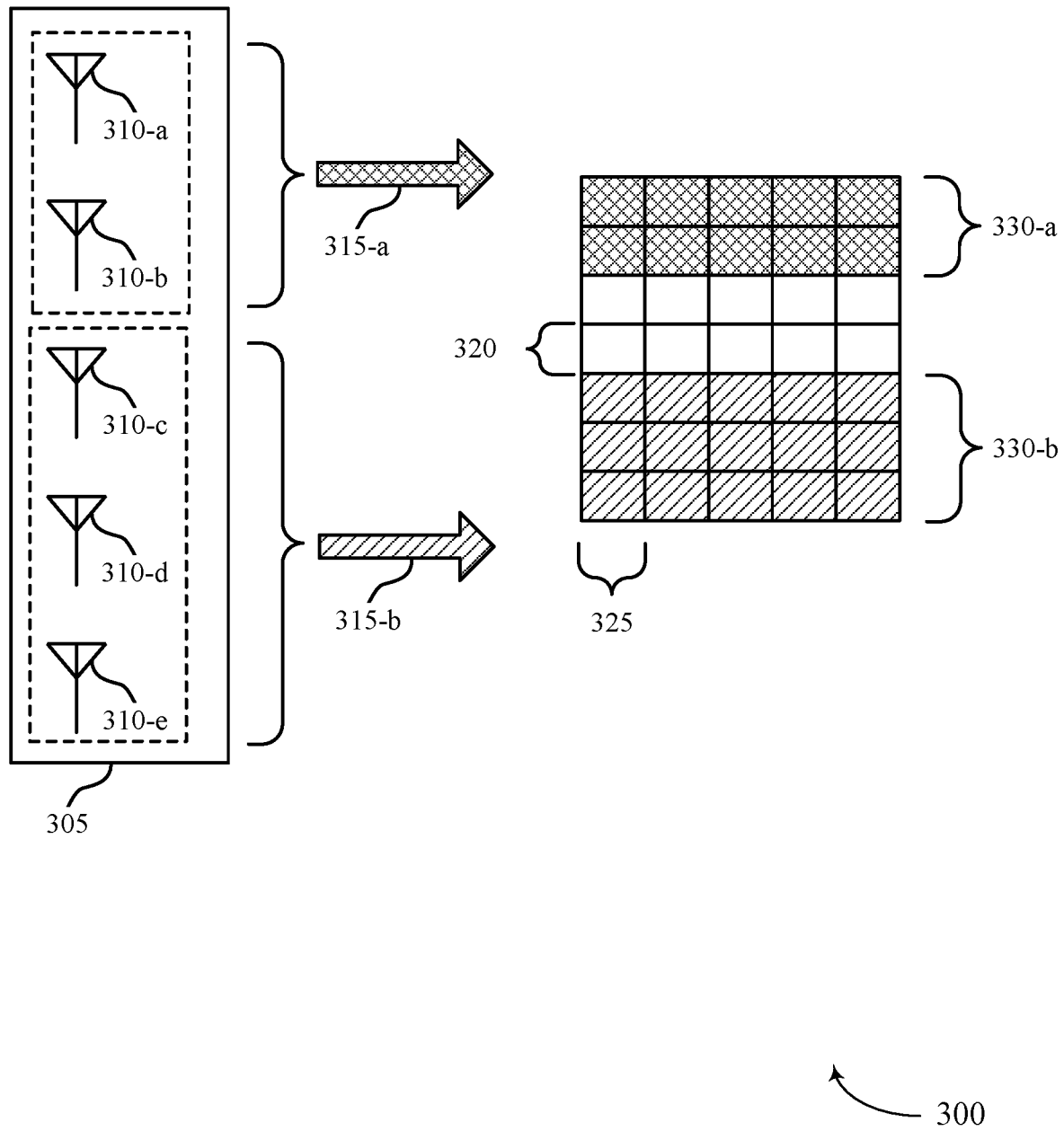
FIG. 3 illustrates an examples transmission diagram in accordance with aspects of the present disclosure.

FIG. 3 illustrates a transmission diagram 300 in a system in accordance with various aspects of the present disclosure. Transmission diagram 300 may apply to a UE 115 and/or a base station 105 as described with reference to FIGS. 1 and 2. Transmission diagram 300 includes five physical antennas 310. As illustrated, all five physical antennas 310 are located within a single antenna panel 305. Alternatively, the physical antennas 310 may grouped into multiple antenna panels (e.g., as illustrated with reference to the dashed boxes) without deviating from the scope of the present disclosure. Five physical antennas 310 are depicted for the sake of explanation; the actual number of physical antennas 310 may vary.

In some cases, one or more of the physical antennas 310 may correspond to a given antenna port. An antenna port does not necessarily correspond to a specific physical antenna 310 but is instead a more general concept introduced to allow for beamforming using multiple antennas 310, among other things. Accordingly, the number of antenna ports and physical antennas 310 need not be equal; the number of antenna ports may be less than or equal to the number of physical antennas 310.

As an example, the outputs of physical antennas 310-*a* and 310-*b* may form a transmit beam 315-*a* (e.g., which may be an example of the transmit beam described with reference to FIG. 2). Physical antennas 310-*a* and 310-*b* may be associated with the same antenna port or with respective antenna ports. In this example, physical antennas 310-*a* and 310-*b* are associated with the same antenna port. Similarly, the outputs of physical antennas 310-*c*, 310-*d*, and 310-*e* may form a transmit beam 315-*b* (e.g., which may be an example of the transmit beam described with reference to FIG. 2). For the sake of explanation, physical antennas 310-*c*, 310-*d*, and 310-*e* are assumed to be associated with the same antenna port (e.g., which is different from the antenna port of physical antennas 310-*a* and 310-*b*). Accordingly, in this example, the five physical antennas 310 are associated with two antenna ports for the sake of simplicity; more antenna ports (e.g., up to five in total) may be used. Additionally, in some cases the one or more antennas may be shared between the different sets of antennas.

The two antenna ports of the present example may, if associated with the same sub-band 330, be considered quasi co-located. As described above, antenna ports may be considered quasi co-located if the spatial parameters of the channel over which a symbol on one antenna port is conveyed can be inferred from the spatial parameters of the channel over which a symbol on the other antenna port is conveyed. Accordingly, in the case that the transmit beams 315-*a*, 315-*b* are transmitted on the same sub-band 330, demodulation of a signal associated with one antenna port may be leveraged to facilitate demodulation (e.g., or modulation) of a signal associated with the other antenna port. In cases where two sub-bands 330 that are the same sub-band 330, they may still support cross-sub-band QCL. However, in the present example, the transmit beams 315-*a*, 315-*b* are transmitted over respective sub-bands 330-*a*, 330-*b*. Each sub-band 330 may span an arbitrary number (e.g., one or more) of frequency intervals 320 for an arbitrary number of time intervals 325. For example, in the case that each frequency interval is 100 MHz in bandwidth, sub-band 330-*a* may be 200 MHz and sub-band 330-*b* may be 300 MHz. In some cases, sub-bands 330 may be configured to be the same width for a given communication system. Although illustrated as comprising contiguous time-frequency resources, it is to be understood that a given sub-band 330 (e.g., of a carrier) may alternatively be distributed across a resource grid in a discontiguous fashion.

Because different base stations 105 may beamform transmissions differently (e.g., using antennas on the same panel or from different panels), a UE 115 may not implicitly determine any QCL spatial relationship between antenna ports across different sub-bands 330. Further, in some cases a UE 115 may receive a downlink transmission over one carrier and transmit an uplink response over a different carrier. Because of the restriction on assuming QCL spatial relationships across carriers, the UE 115 may not be able to implicitly determine an uplink transmit beam to be used based on the downlink receive beam. However, through the use of spatial QCL relationship signaling described herein, the UE 115 may be able to identify QCL relationships (e.g., spatial QCL relationships between uplink signals transmitted on both sub-bands 330, or downlink signals transmitted on both sub-bands 330) or reciprocal QCL relationships (e.g., a reciprocal QCL relationship between downlink signals transmitted on sub-band 330-*a* and uplink signals transmitted on sub-band 330-*b*, or vice versa). Using these spatial QCL relationships, the UE 115 may determine an appropriate receive beam(s) and transmit beam(s) used for communication with a base station 105.

Figure 4:
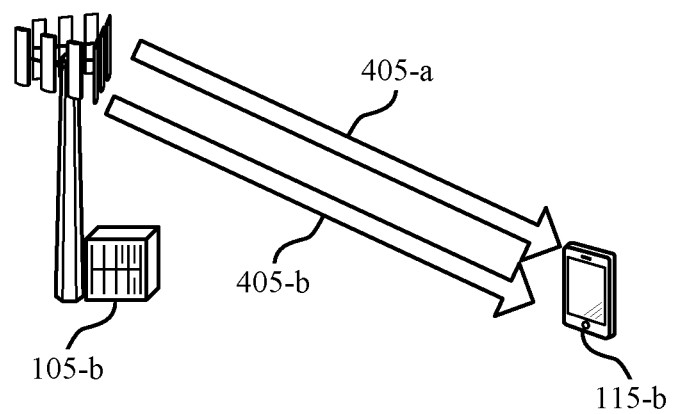
FIGS. 4 through 5 illustrate examples of sub-band transmissions in accordance with aspects of the present disclosure.

FIG. 4 illustrates an example of sub-band transmissions 400 in accordance with various aspects of the present disclosure. In some examples, sub-band transmissions 400 may implement aspects of wireless communications system 100. Sub-band transmissions 400 includes communication between base station 105-*b* and UE 115-*b*, each of which may be an example of the corresponding devices described above with reference to FIGS. 1 through 3.

As illustrated, base station 105-*b* may send respective transmissions to UE 115-*b* over a first sub-band 405-*a* and a second sub-band 405-*b*. In accordance with aspects of the present disclosure, base station 105-*b* may signal to UE 115-*b* that the downlink transmission on first sub-band 405-*a* is quasi co-located with the downlink transmission on second sub-band 405-*b* (e.g., because UE 115-*b* may not be able to implicitly assume such a QCL relationship). For instance, base station 105-*b* may signal an indication of the QCL relationship to UE 115-*b* using a transmission configuration indicator. In some examples, the base station 105-b may indicate specifically which spatial parameters may be treated as quasi co-located (e.g., beam width, pointing angle, etc.), and may additionally or alternatively indicate a QCL type. UE 115-b may utilize this information to receive the downlink transmission over second sub-band 405-b (e.g., based on the received beam spatial parameters used to receive first sub-band 405-a).

In various aspects of the present disclosure, the spatial QCL relationships may be applied across different channels or signals. For example, first sub-band 405-a and second sub-band 405-b may carry one or more of physical downlink control channel (PDCCH) demodulation reference signal (DMRS), physical downlink shared channel (PDSCH) DMRS, channel state information reference signal (CSI-RS), and synchronization signals (SS). In some cases, the synchronization signals may include a synchronization signal block (e.g., including a primary synchronization signal (PSS), secondary synchronization signal (SSS), and a broadcast channel, such as a physical broadcast channel (PBCH)), or one or more synchronization signal blocks included in a synchronization signal burst. Spatial QCL relationships may be specified between any subset of these channels across the sub-bands 405. For example, a spatial QCL relationship may be applied across the PDCCH DMRS of first sub-band 405-a and the PDSCH DMRS of second sub-band 405-b.

Various techniques for signaling the spatial QCL relationship are considered within the scope of the present disclosure. For example, the signaling may be via RRC signaling, MAC control element (CE) signaling, downlink control information (DCI) signaling, or any combination thereof. As described above, the signaling may specify whether a spatial QCL relationship exists between sub-bands and/or which spatial parameters may be treated as quasi co-located. It is to be understood that the same concepts may be applied to spatial QCL relationships across different carriers (e.g., in addition to or instead of sub-bands 405).

Figure 5:
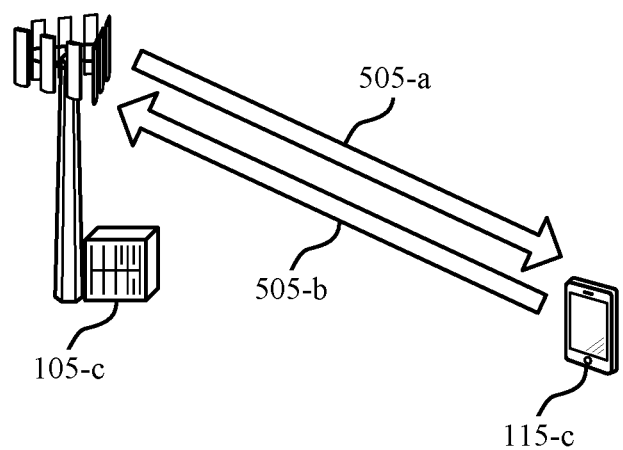

FIG. 5 illustrates an example of sub-band transmissions 500 in accordance with various aspects of the present disclosure. In some examples, sub-band transmissions 500 may implement aspects of wireless communications system 100. Sub-band transmissions 500 includes communication between base station 105-c and UE 115-c, each of which may be an example of the corresponding devices described above with reference to FIGS. 1, 2, and 5.

As illustrated, base station 105-c may send a downlink transmission (e.g., a downlink reference signal) to UE 115-c over a first sub-band 505-a and receive an uplink transmission from UE 115-c over a second sub-band 505-b. In accordance with aspects of the present disclosure, base station 105-c may signal to UE 115-c to use a transmit second sub-band 505-b over a transmit beam derived from a receive beam corresponding to a downlink reference signal transmitted over first sub-band 505-a. That is, base station 105-c may indicate a reciprocal spatial QCL relationship. As with sub-band transmissions 400, base station 105-c may indicate specifically which spatial parameters may be treated as quasi co-located (e.g., beam width, pointing angle, etc.). UE 115-c may utilize this information to transmit the uplink transmission over second sub-band 505-b (e.g., based on the received beam spatial parameters used to receive first sub-band 505-a).

In various aspects of the present disclosure, the reciprocal spatial QCL relationships may be applied across different channels. For example, first sub-band 505-a may carry one or more of PDCCH DMRS, PDSCH DMRS, CSI-RS, and SS. Second sub-band 505-b may carry one or more of physical uplink shared channel (PUSCH) DMRS, physical uplink control channel (PUCCH) DMRS, sounding reference signal (SRS), and random access channel (RACH). In some examples, RACH signaling on second sub-band 505-b may be used in conjunction with SSs (e.g., an SS block or SS burst) being used on first sub-band 505-a. Reciprocal spatial QCL relationships can be specified between any subset of these channels across the sub-bands 505. For example, a reciprocal spatial QCL relationship may be applied across the PDCCH DMRS of first sub-band 505-a and the PUCCH DMRS of second sub-band 505-b. Additionally or alternatively, a reciprocal spatial QCL relationship may be applied across the CSI-RS of first sub-band 505-a and the SRS of second sub-band 505-b. It should be noted that the reciprocal spatial QCL relationship may also include a reciprocal spatial QCL for any combination of carriers. For example, base station 105-c may send a downlink CSI-RS on second sub-band 505-b based on a SRS transmission on first sub-band 505-a (e.g., using an associated transmission port). In any event, there may be a symmetry of reciprocal spatial QCL relationships, where there are reciprocal QCL relationships between, for example, downlink transmissions of CSI-RS and uplink transmissions of SRS as well as between the uplink transmission of SRS and the downlink transmission of CSI-RS.

Various techniques for signaling the reciprocal spatial QCL relationship are considered within the scope of the present disclosure. For example, the signaling may be via RRC signaling, MAC CE signaling, DCI signaling, or any combination thereof. As described above, the signaling may specify whether a reciprocal spatial QCL relationship exists between sub-bands and/or which spatial parameters may be treated as quasi co-located. It is to be understood that the same concepts may be applied to spatial QCL relationships across different carriers and BWPs (e.g., in addition to or instead of sub-bands 505).

Figure 6:
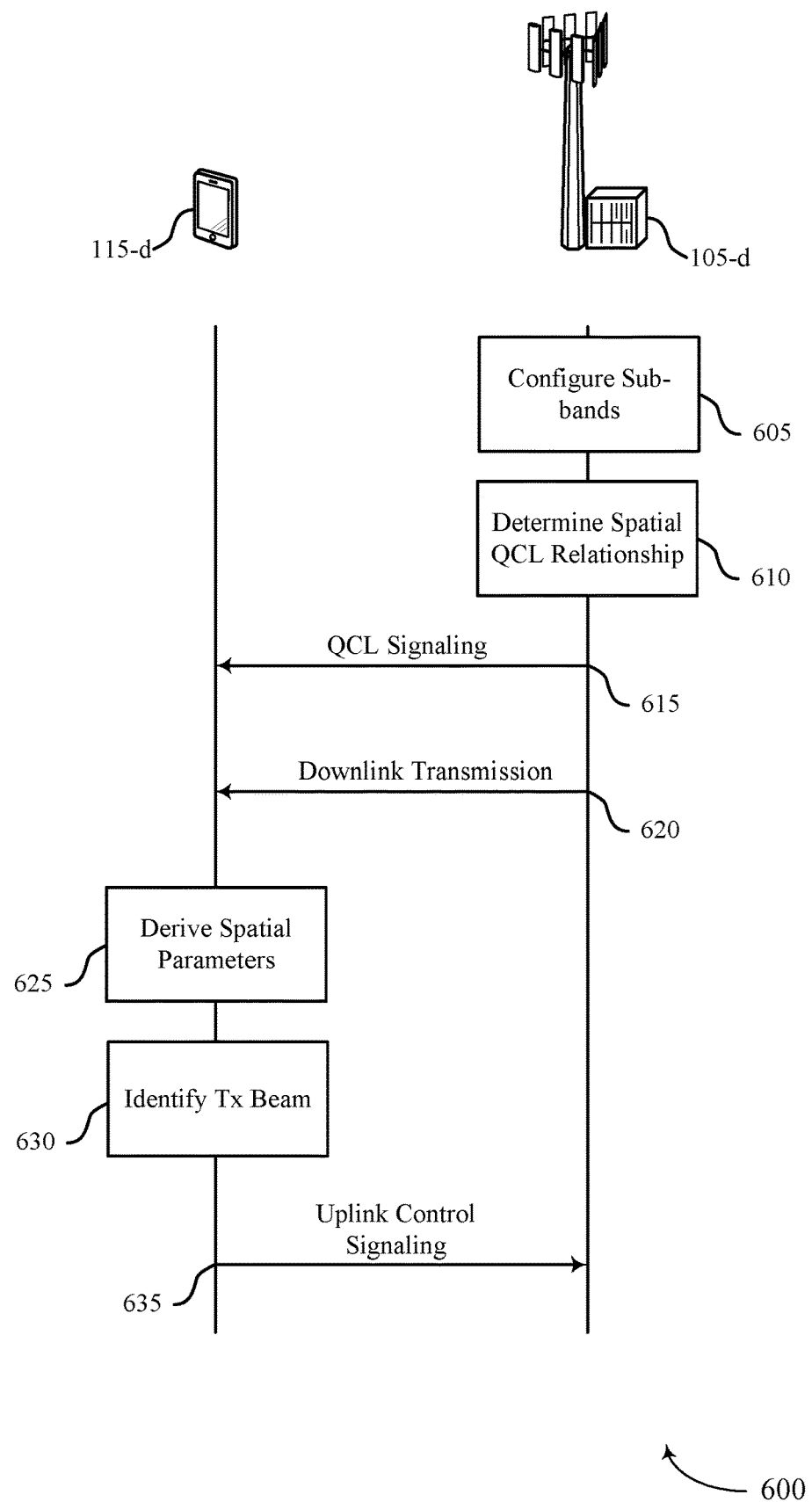
FIGS. 6 and 7 illustrate examples of process flows in accordance with aspects of the present disclosure

FIG. 6 illustrates an example process flow 600 in accordance with various aspects of the present disclosure. Process flow 600 includes base station 105-d and UE 115-d, each of which may be an example of the corresponding device described above with reference to FIGS. 1 through 5.

At 605, base station 105-d may configure a first sub-band and a second sub-band of a system bandwidth for communication with UE 115-d. In some examples, the first sub-band and the second sub-band may be the same. As described above, the first sub-band may alternatively be a first carrier (e.g., which may include multiple sub-bands) and the second sub-band may be a second carrier without deviating from the scope of the present disclosure.

At 610, base station 105-d may determine a spatial QCL relationship between the first sub-band and the second sub-band. In some cases, determining the spatial QCL relationship comprises determining a reciprocal QCL relationship across the first sub-band and the second sub-band (e.g., as described above with reference to FIG. 5). That is, the reciprocal QCL relationship may be associated with spatial parameters used for reception by UE 115-d of one or more downlink signals transmitted on the first sub-band and transmission by UE 115-d of one or more uplink signals transmitted on the second sub-band.

At 615, base station 105-d may transmit (e.g., and UE 115-d may receive) signaling that indicates a spatial QCL relationship between a first sub-band and a second sub-band of a system bandwidth. In some cases, the QCL signaling is communicated over RRC messaging, MAC CE, DCI, or some combination thereof. In some cases, 605 and 615 may be performed simultaneously (e.g., using the same control signaling).

At 620, base station 105-*d* may transmit (e.g., and UE 115-*d* may receive) a downlink transmission over the first sub-band. The downlink transmission may include one or more of a PDCCH DMRS, a PDSCH DMRS, a CSI-RS, or an SS. At 625, UE 115-*d* may derive spatial parameters for communication with base station 105-*d* via the second sub-band based on spatial parameters used for reception of the downlink transmission at 620. In some cases, the spatial parameters are derived based on the spatial QCL relationship indicated at 615.

The spatial parameters may include a pointing angle, a beam width, a beam direction, a delay spread, a Doppler spread, a Doppler shift, an average gain, an average delay, or any combination thereof. In some cases, deriving the spatial parameters includes deriving parameters for a transmit beam (e.g., identified at 630), the derived parameters being for functions that are reciprocal of functions defined by the spatial parameters used for reception of the downlink transmission at 620. For example, the derived beam direction may be used for an uplink transmission, which is a reciprocal of the downlink transmission over which the spatial parameters were derived.

At 630, UE 115-*d* may identify a transmit beam for communicating with base station 105-*d* via the second sub-band based on the spatial QCL relationship. In some cases, UE 115-*d* may identify a set of analog beamforming weights associated with the spatial parameters used for reception of the downlink transmission at 620. These analog beamforming weights may be adjusted for the transmit beam based on the spatial QCL relationship indicated at 615.

At 635, UE 115-*d* may transmit (e.g., and base station 105-*d* may receive) uplink control information on the second sub-band using the transmit beam determined at 630 and the spatial parameters derived at 625. The uplink control information may include a PUCCH DMRS, a PUSCH DMRS, an SRS, a RACH, or any combination thereof.

Figure 7:
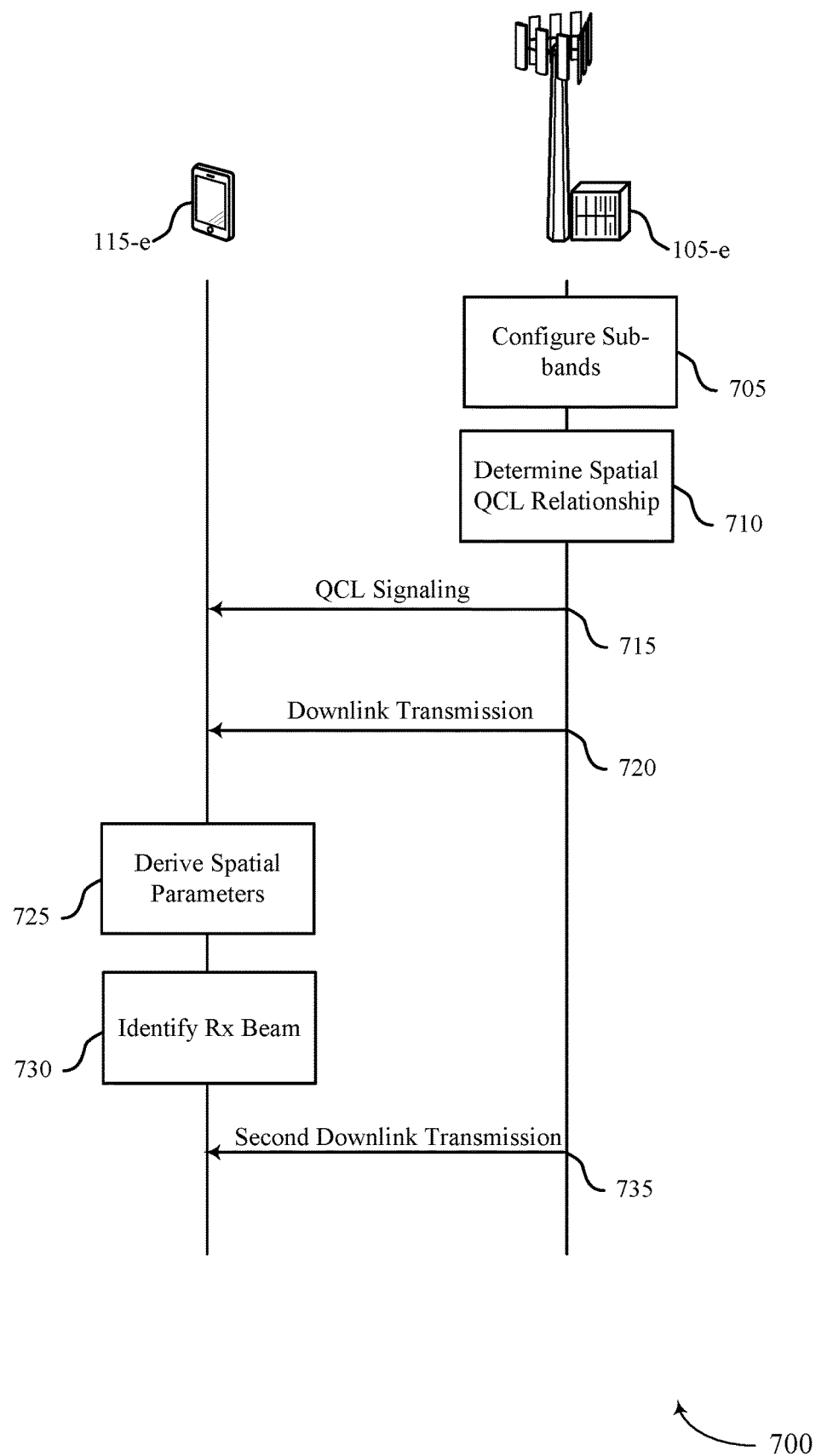

FIG. 7 illustrates an example process flow 700 in accordance with various aspects of the present disclosure. Process flow 700 includes base station 105-*e* and UE 115-*e*, each of which may be an example of the corresponding device described above with reference to FIGS. 1 through 6.

At 705, base station 105-*e* may configure a first sub-band and a second sub-band of a system bandwidth for communication with UE 115-*e*. As described above, the first sub-band may alternatively be a first carrier (e.g., which may include multiple sub-bands) and the second sub-band may be a second carrier without deviating from the scope of the present disclosure.

At 710, base station 105-*e* may determine a spatial QCL relationship between the first sub-band and the second sub-band. In some cases, determining the spatial QCL relationship includes determining a QCL relationship across the first sub-band and the second sub-band as described above with reference to FIG. 4. That is, the QCL relationship may be associated with spatial parameters for reception by the UE of a first downlink signal transmitted on the first sub-band and reception by the UE of a second downlink signal transmitted on the second sub-band.

At 715, base station 105-*e* may transmit (e.g., and UE 115-*e* may receive) signaling that indicates a spatial QCL relationship between a first sub-band and a second sub-band of a system bandwidth. In some cases, the QCL signaling is communicated over RRC messaging, MAC CE, DCI, or some combination thereof. In some cases, 705 and 715 may be performed simultaneously (e.g., using the same control signaling). In some cases, UE 115-*e* may apply the spatial QCL relationship as a QCL relationship across the first sub-band and the second sub-band, where the QCL relationship may be associated with spatial parameters used for reception of a first downlink signal received via the downlink transmission on the first sub-band and reception of a second downlink signal received on the second sub-band. Additionally or alternatively, the QCL relationship may be associated with spatial parameters used for transmission of a first uplink signal on the first sub-band and transmission of a second uplink signal transmitted on the second sub-band.

At 720, base station 105-*e* may transmit (e.g., and UE 115-*e* may receive) a downlink transmission over the first sub-band. The first downlink transmission may include one or more of a PDCCH DMRS, a PDSCH DMRS, a CSI-RS, or an SS. At 725, UE 115-*e* may derive spatial parameters for communication with base station 105-*e* via the second sub-band based on spatial parameters used for reception of the downlink transmission at 720. In some cases, the spatial parameters are derived based on the spatial QCL relationship indicated at 715. The spatial parameters may include a pointing angle, a beam width, a beam direction, a delay spread, a Doppler spread, a Doppler shift, an average gain, an average delay, or any combination thereof. In some cases, deriving the spatial parameters includes deriving parameters for a receive beam (e.g., identified at 730).

At 730, UE 115-*e* may identify a receive beam for communicating with base station 105-*e* via the second sub-band based on the spatial QCL relationship. In some cases, identifying the receive beam may include identifying a set of analog beamforming weights associated with the spatial parameters used for reception of the downlink transmission at 720. These analog beamforming weights may be adjusted for the receive beam based on the spatial QCL relationship indicated at 715.

At 735, UE 115-*e* may receive (e.g., and base station 105-*e* may transmit) a second downlink transmission on the second sub-band using the receive beam determined at 730 and the spatial parameters derived at 725. The second downlink transmission may include one or more of a PDCCH DMRS, a PDSCH DMRS, a CSI-RS, or an SS.

Figure 8:
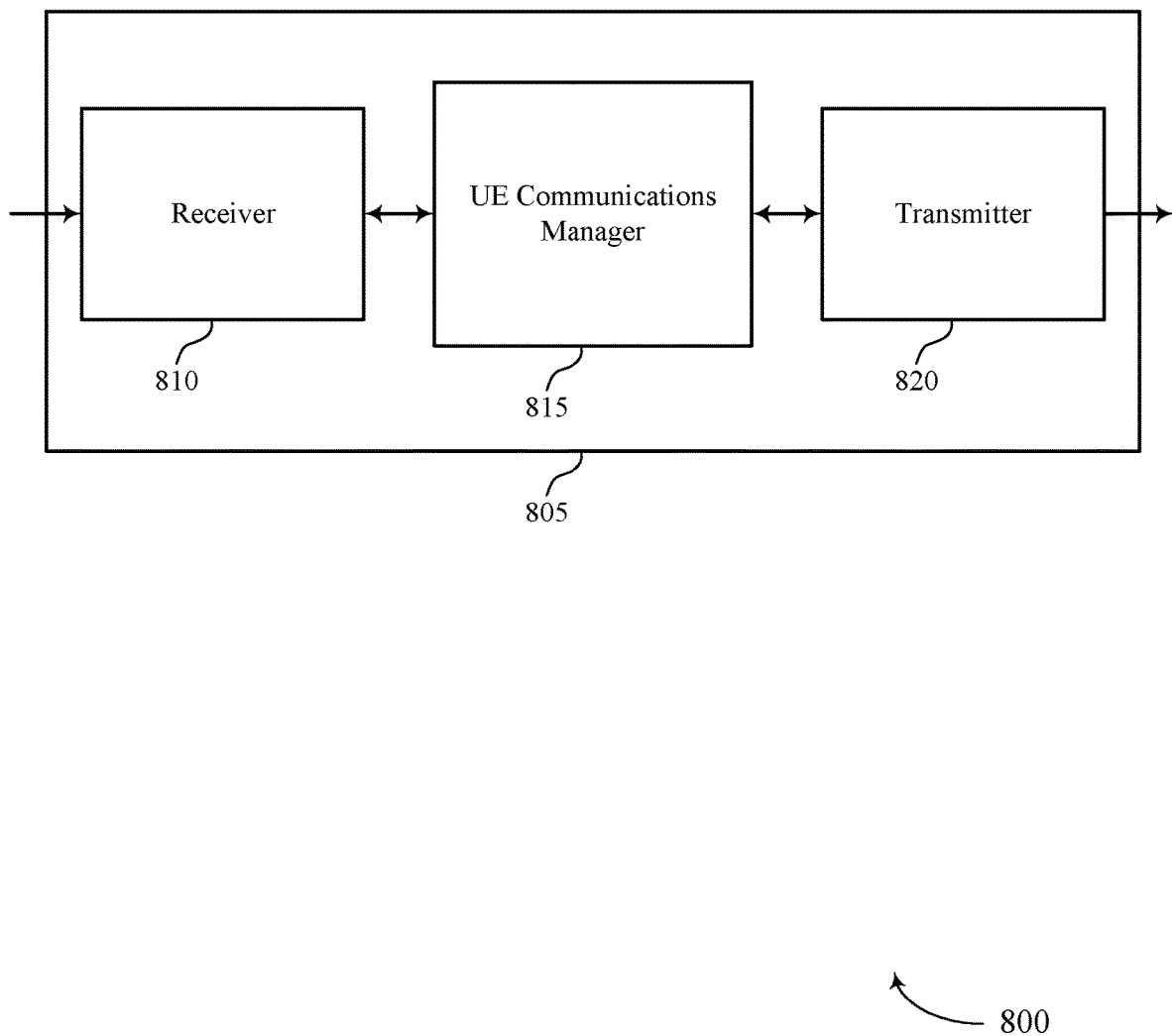
FIGS. 8 through 10 show block diagrams of a device in accordance with aspects of the present disclosure.

FIG. 8 shows a block diagram 800 of a wireless device 805 in accordance with aspects of the present disclosure. Wireless device 805 may be an example of aspects of a UE 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to cross-sub-band quasi co-location signaling, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11. UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may receive signaling from a base station 105 that indicates a spatial QCL relationship between a first sub-band and a second sub-band of a system bandwidth, derive spatial parameters for communication with the base station 105 via the second sub-band based on the spatial QCL relationship, and communicate with the base station 105 via the second sub-band using the derived spatial parameters. The derived spatial parameters may be based on spatial parameters used for reception of a downlink transmission from the base station 105 via the first sub-band.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
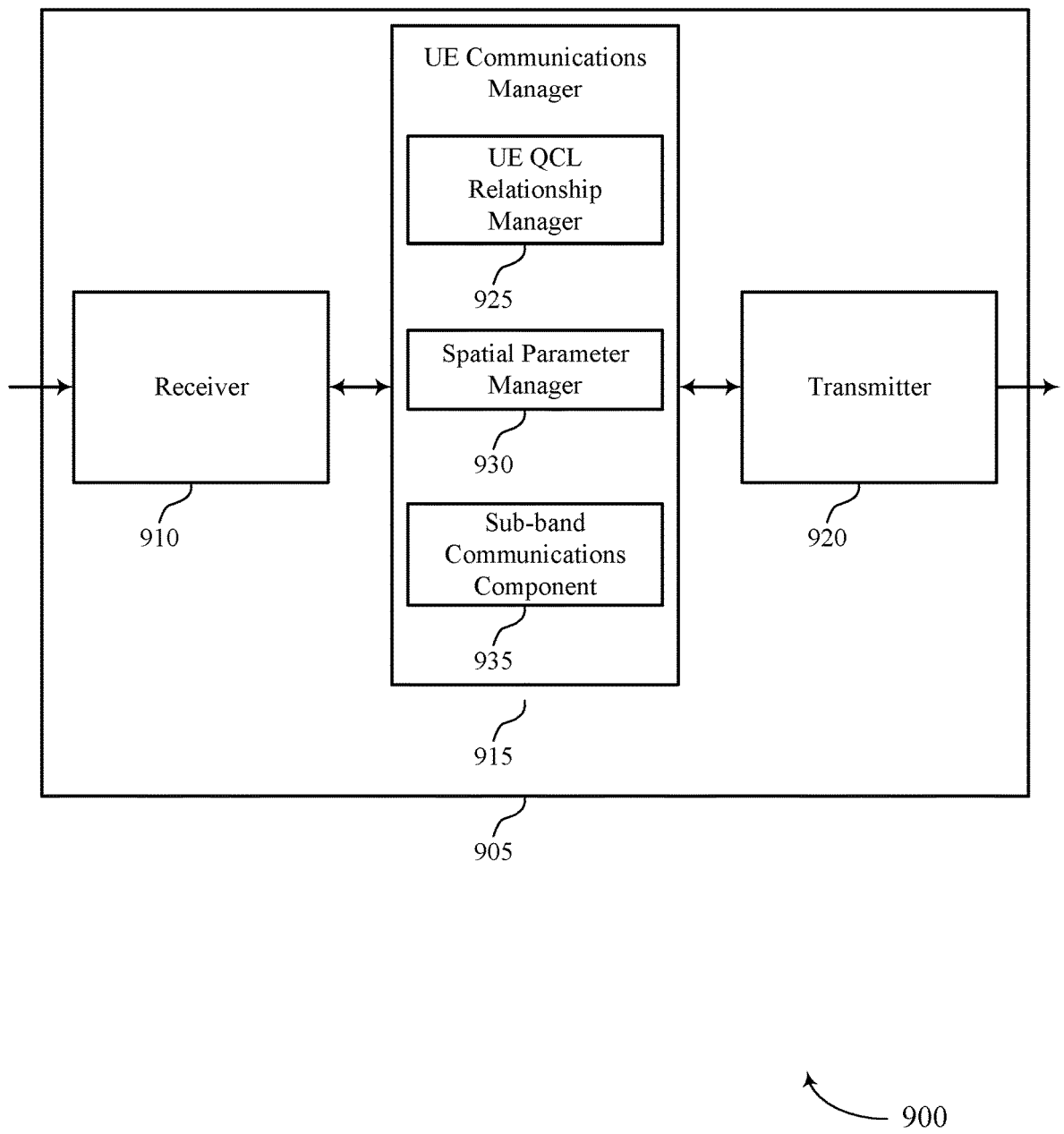

FIG. 9 shows a block diagram 900 of a wireless device 905 in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to cross-sub-band quasi co-location signaling, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. UE communications manager 915 may also include UE QCL relationship manager 925, spatial parameter manager 930, and sub-band communications component 935.

UE QCL relationship manager 925 may receive signaling from a base station 105 that indicates a spatial QCL relationship between a first sub-band and a second sub-band of a system bandwidth. In some examples, UE QCL relationship manager 925 may apply the spatial QCL relationship as a reciprocal QCL relationship across the first sub-band and the second sub-band, where the reciprocal QCL relationship is associated with spatial parameters used for reception of one or more downlink signals received via the downlink transmission on the first sub-band and transmission of one or more uplink signals transmitted on the second sub-band. Additionally or alternatively, UE QCL relationship manager 925 may apply the spatial QCL relationship as a QCL relationship across the first sub-band and the second sub-band, where the QCL relationship is associated with spatial parameters used for reception of a first downlink signal received via the downlink transmission on the first sub-band and reception of a second downlink signal received on the second sub-band.

In some examples, UE QCL relationship manager 925 may receive the signaling using RRC messaging, a MAC CE, DCI, or a combination thereof. In some cases, the one or more downlink signals include a PDCCH DMRS, a PDSCH DMRS, a CSI-RS, a synchronization signal, or any combination thereof. Additionally, the one or more uplink signals may include a PUCCH DMRS, a PUSCH DMRS, a SRS, a RACH, or any combination thereof. In some cases, the first downlink signal and the second downlink signal include a PDCCH DMRS, a PDSCH DMRS, a CSI-RS, a synchronization signal, or any combination thereof. In some cases, the first sub-band includes a first carrier and the second sub-band includes a second carrier. Additionally or alternatively, the first sub-band may include a first BWP and the second sub-band includes a second BWP.

Spatial parameter manager 930 may derive, based on the spatial QCL relationship, spatial parameters for communication with the base station 105 via the second sub-band based on spatial parameters used for reception of a downlink transmission from the base station 105 via the first sub-band. In some cases, deriving spatial parameters may include deriving spatial parameters for the transmission beam, where the derived spatial parameters being for functions that are reciprocal of functions defined by the spatial parameters used for reception of the downlink transmission. In some cases, the derived spatial parameters include a pointing angle, a beam width, a beam direction, or a combination thereof. Sub-band communications component 935 may communicate with the base station 105 via the second sub-band using the derived spatial parameters. In some examples, the communicating includes transmitting uplink control information on the second sub-band using the transmission beam.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
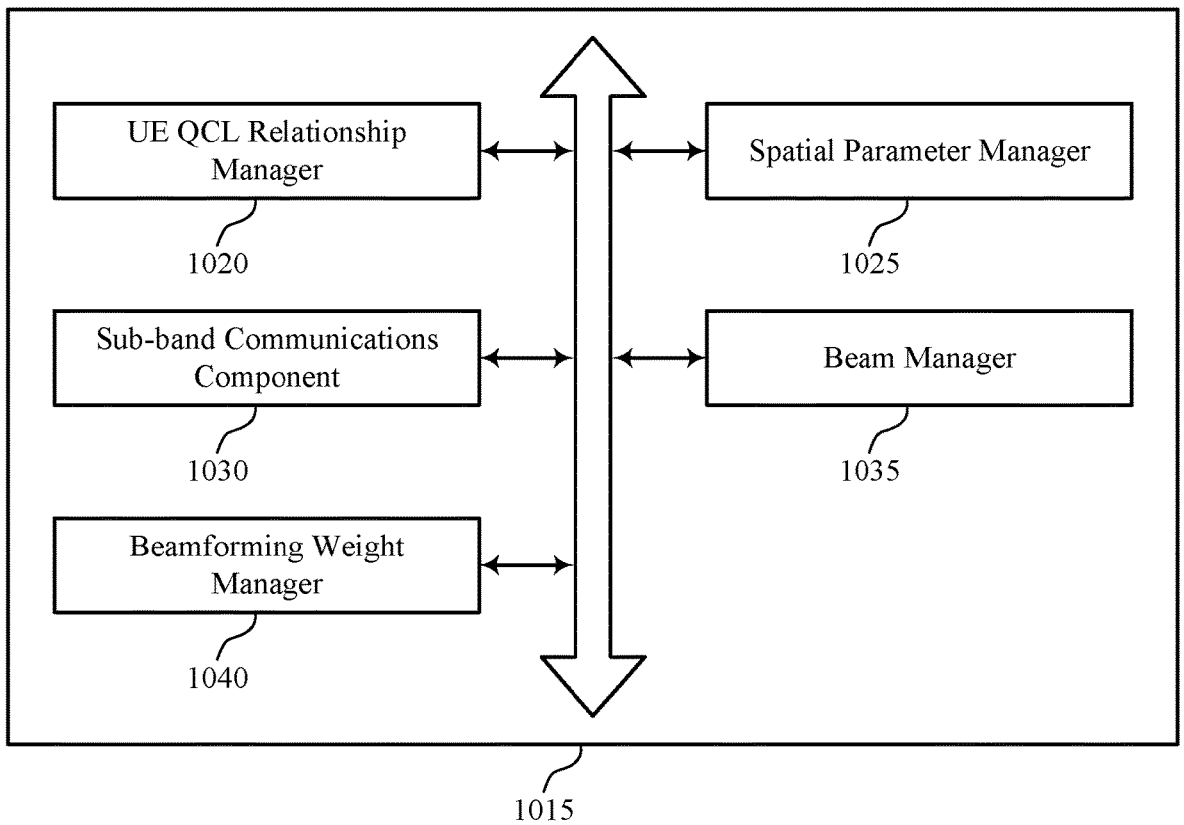

FIG. 10 shows a block diagram 1000 of a UE communications manager 1015 in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include UE QCL relationship manager 1020, spatial parameter manager 1025, sub-band communications component 1030, beam manager 1035, and beamforming weight manager 1040. Each of these modules may communicate, directly or indirectly, with one another (e.g., via one or more buses).

UE QCL relationship manager 1020 may receive signaling from a base station 105 that indicates a spatial QCL relationship between a first sub-band and a second sub-band of a system bandwidth. In some examples UE QCL relationship manager 1020 may apply the spatial QCL relationship as a reciprocal QCL relationship across the first sub-band and the second sub-band, where the reciprocal QCL relationship is associated with spatial parameters used for reception of one or more downlink signals received via the downlink transmission on the first sub-band and transmission of one or more uplink signals transmitted on the second sub-band. Additionally or alternatively, UE QCL relationship manager 1020 may apply the spatial QCL relationship as a QCL relationship across the first sub-band and the second sub-band, where the QCL relationship is associated with spatial parameters used for reception of a first downlink signal received via the downlink transmission on the first sub-band and reception of a second downlink signal received on the second sub-band.

In some examples, UE QCL relationship manager 1020 may receive the signaling using RRC messaging, a MAC CE, DCI, or a combination thereof. In some cases, the one or more downlink signals include a PDCCH DMRS, a PDSCH DMRS, a CSI-RS, a synchronization signal, or any combination thereof. Additionally, the one or more uplink signals may include a PUCCH DMRS, a PUSCH DMRS, a SRS, a RACH, or any combination thereof. In some cases, the first downlink signal and the second downlink signal include a PDCCH DMRS, a PDSCH DMRS, a CSI-RS, a synchronization signal, or any combination thereof. In some cases, the first sub-band includes a first carrier and the second sub-band includes a second carrier.

Spatial parameter manager 1025 may derive, based on the spatial QCL relationship, spatial parameters for communication with the base station 105 via the second sub-band based on spatial parameters used for reception of a downlink transmission from the base station 105 via the first sub-band. In some cases, deriving spatial parameters may include deriving spatial parameters for the transmission beam, where the derived spatial parameters being for functions that are reciprocal of functions defined by the spatial parameters that are used for reception of the downlink transmission. In some cases, the derived spatial parameters include a pointing angle, a beam width, a beam direction, or a combination thereof.

Sub-band communications component 1030 may communicate with base station 105 via the second sub-band using the derived spatial parameters. In some examples, communicating with base station 105 includes transmitting uplink control information on the second sub-band using a transmission beam. In some examples, the first sub-band and the second sub-band may be the same. Additionally or alternatively, the communicating includes receiving a second downlink transmission on the second sub-band using a reception beam.

Beam manager 1035 may identify the transmission beam for communicating with the base station 105 via the second sub-band based on the spatial QCL relationship. Additionally or alternatively, beam manager 1035 may identify the reception beam for communicating with the base station 105 via the second sub-band based on the spatial QCL relationship.

Beamforming weight manager 1040 may identify a set of analog beamforming weights associated with the spatial parameters used for reception of the downlink transmission, and adjust the set of analog beamforming weights for use with the transmission beam based on the spatial QCL relationship. In some examples, beamforming weight manager 1040 may identify a set of analog beamforming weights associated with the spatial parameters used for reception of the downlink transmission, where the downlink transmission is a first downlink transmission, and adjust the set of analog beamforming weights for use with the reception beam based on the spatial QCL relationship. In some cases, the first downlink transmission includes a channel CSI-RS and the second downlink transmission includes a PDSCH DMRS.

Figure 11:
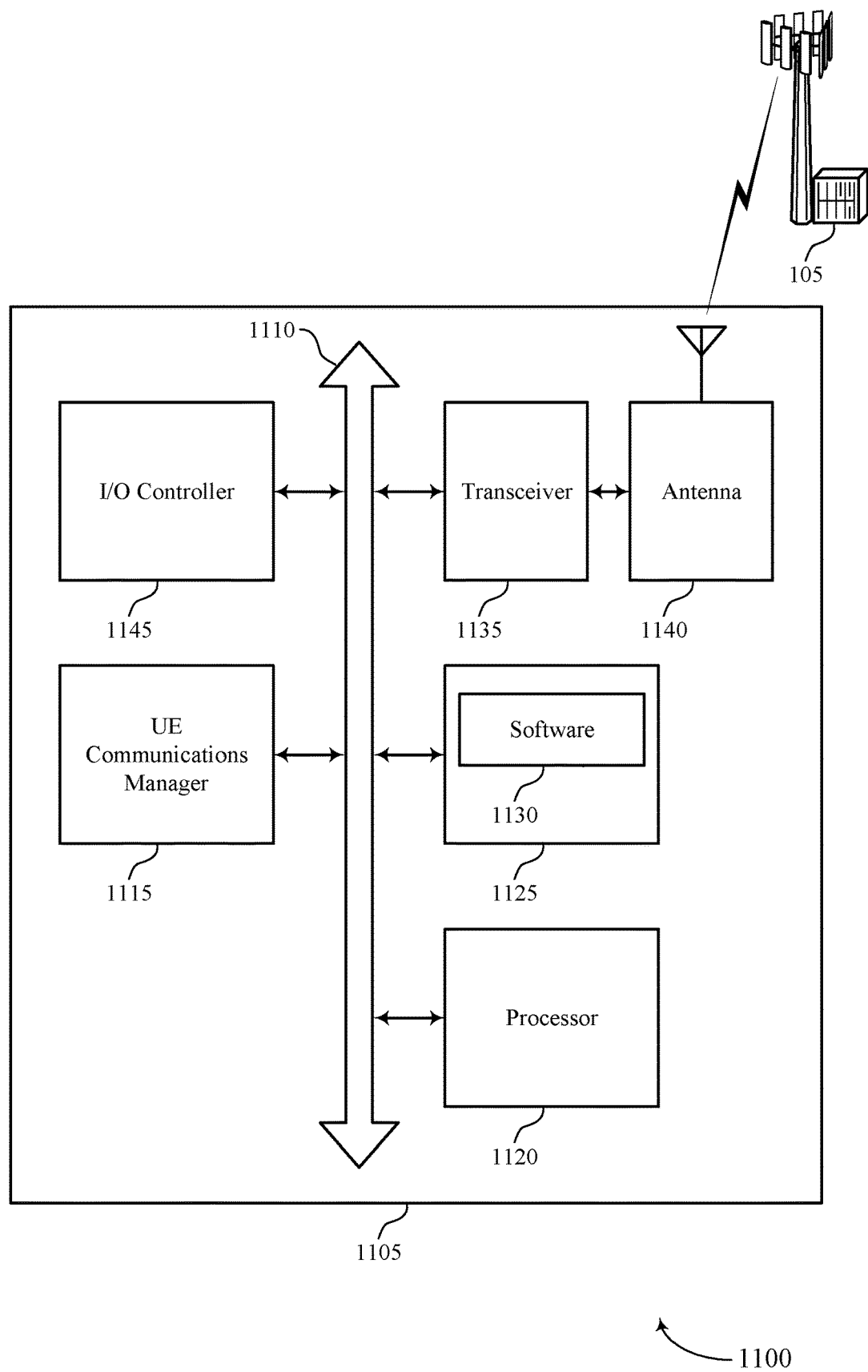
FIG. 11 illustrates a block diagram of a system including a user equipment (UE) in accordance with aspects of the present disclosure.

FIG. 11 shows a diagram of a system 1100 including a device 1105 in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting cross-sub-band quasi co-location signaling).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support cross-sub-band quasi co-location signaling. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
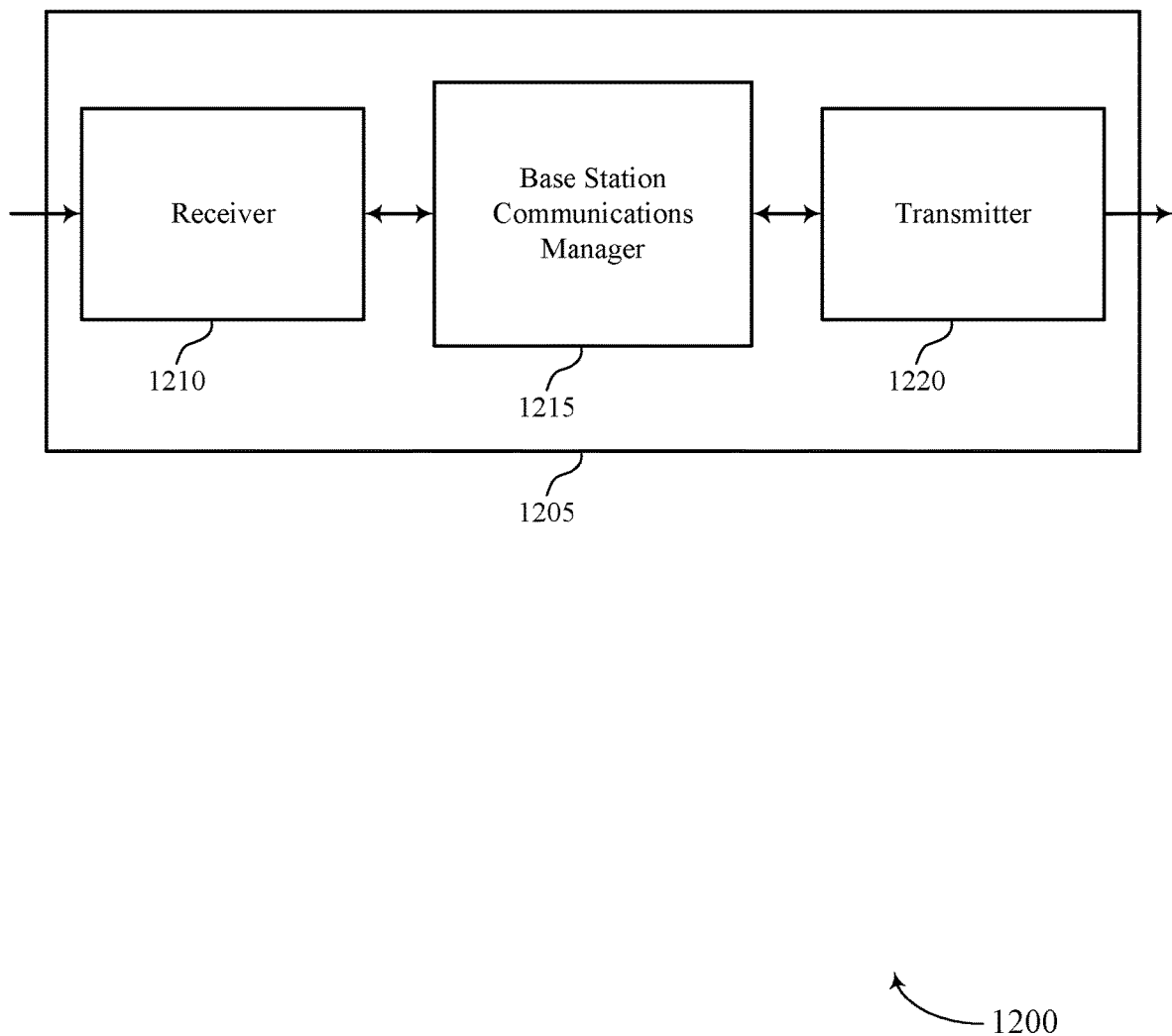
FIGS. 12 through 14 show block diagrams of a device in accordance with aspects of the present disclosure.

FIG. 12 shows a block diagram 1200 of a wireless device 1205 in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to cross-sub-band quasi co-location signaling, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15. Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may configure a first sub-band and a second sub-band of a system bandwidth for communication with a UE 115, determine a spatial QCL relationship between the first sub-band and the second sub-band, and transmit signaling to the UE 115 that indicates the determined spatial QCL relationship.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
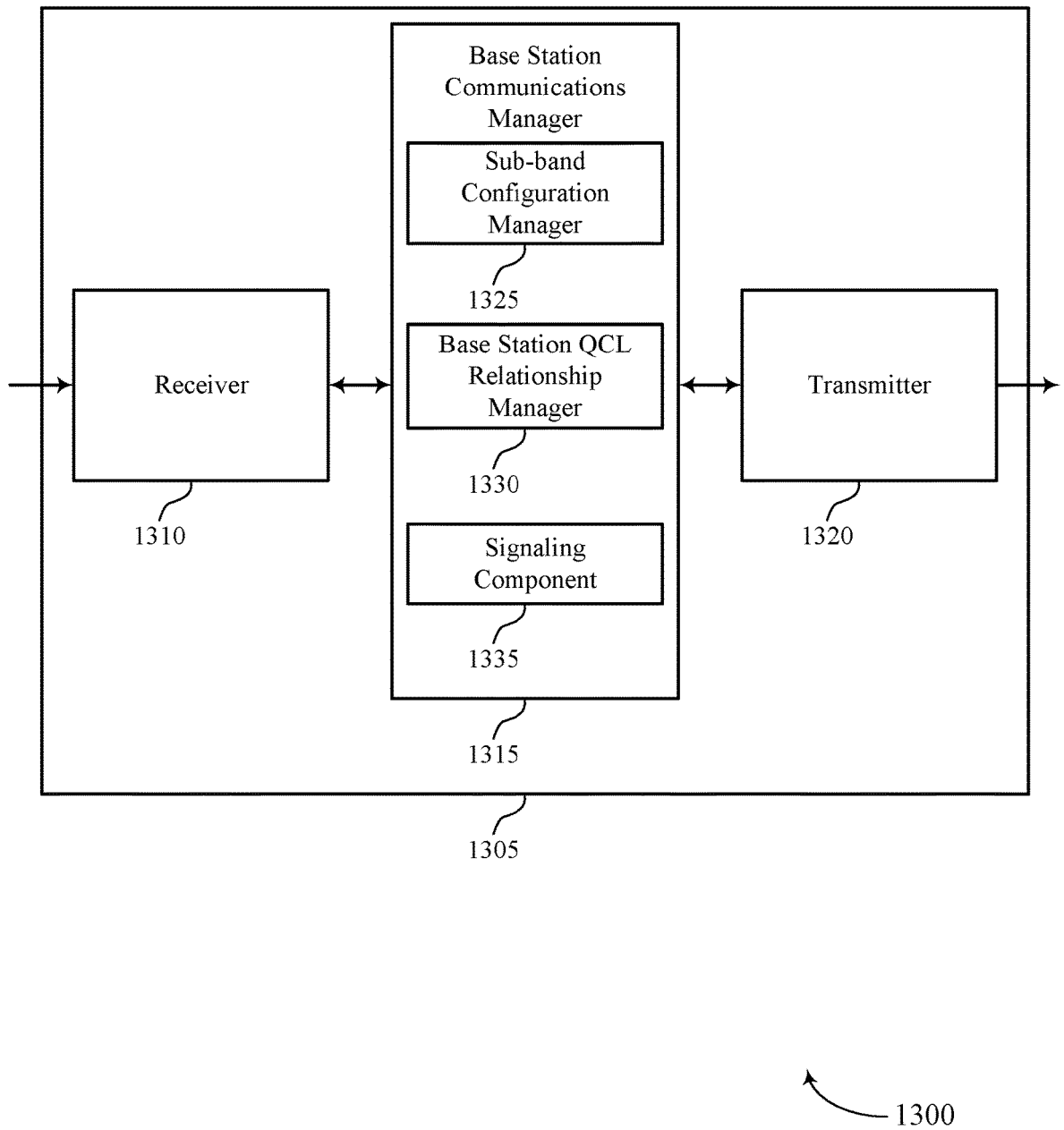

FIG. 13 shows a block diagram 1300 of a wireless device 1305 in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to cross-sub-band quasi co-location signaling, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15. Base station communications manager 1315 may also include sub-band configuration manager 1325, base station QCL relationship manager 1330, and signaling component 1335.

Sub-band configuration manager 1325 may configure a first sub-band and a second sub-band of a system bandwidth for communication with a UE 115. In some cases, the first sub-band includes a first carrier and the second sub-band includes a second carrier. Base station QCL relationship manager 1330 may determine a spatial QCL relationship between the first sub-band and the second sub-band. In some cases, determining the spatial QCL relationship between the first sub-band and the second sub-band includes determining a reciprocal QCL relationship across the first sub-band and the second sub-band. The reciprocal QCL relationship may be associated with spatial parameters used for reception, by the UE 115, of one or more downlink signals transmitted on the first sub-band and transmission, by the UE 115, of one or more uplink signals transmitted on the second sub-band. In some cases, the one or more downlink signals include a PDCCH DMRS, a PDSCH DMRS, a CSI-RS, a synchronization signal, or any combination thereof. The one or more uplink signals may include a PUCCH DMRS, a PUSCH DMRS, a SRS, a RACH, or any combination thereof.

In some examples, determining the spatial QCL relationship between the first sub-band and the second sub-band may include determining a QCL relationship across the first sub-band and the second sub-band. The QCL relationship may be associated with spatial parameters for reception by the UE 115 of a first downlink signal transmitted on the first sub-band and reception by the UE 115 of a second downlink signal transmitted on the second sub-band. In such cases, the first downlink signal and the second downlink signal include a PDCCH DMRS, a PDSCH DMRS, a CSI-RS, a synchronization signal, or any combination thereof. In some cases, the spatial QCL relationship is associated with spatial parameters including a pointing angle, a beam width, a beam direction, or a combination thereof. Signaling component 1335 may transmit signaling to the UE 115 that indicates the determined spatial QCL relationship. In some cases, transmitting the signaling includes: transmitting the signaling using RRC messaging, a MAC CE, DCI, or a combination thereof.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
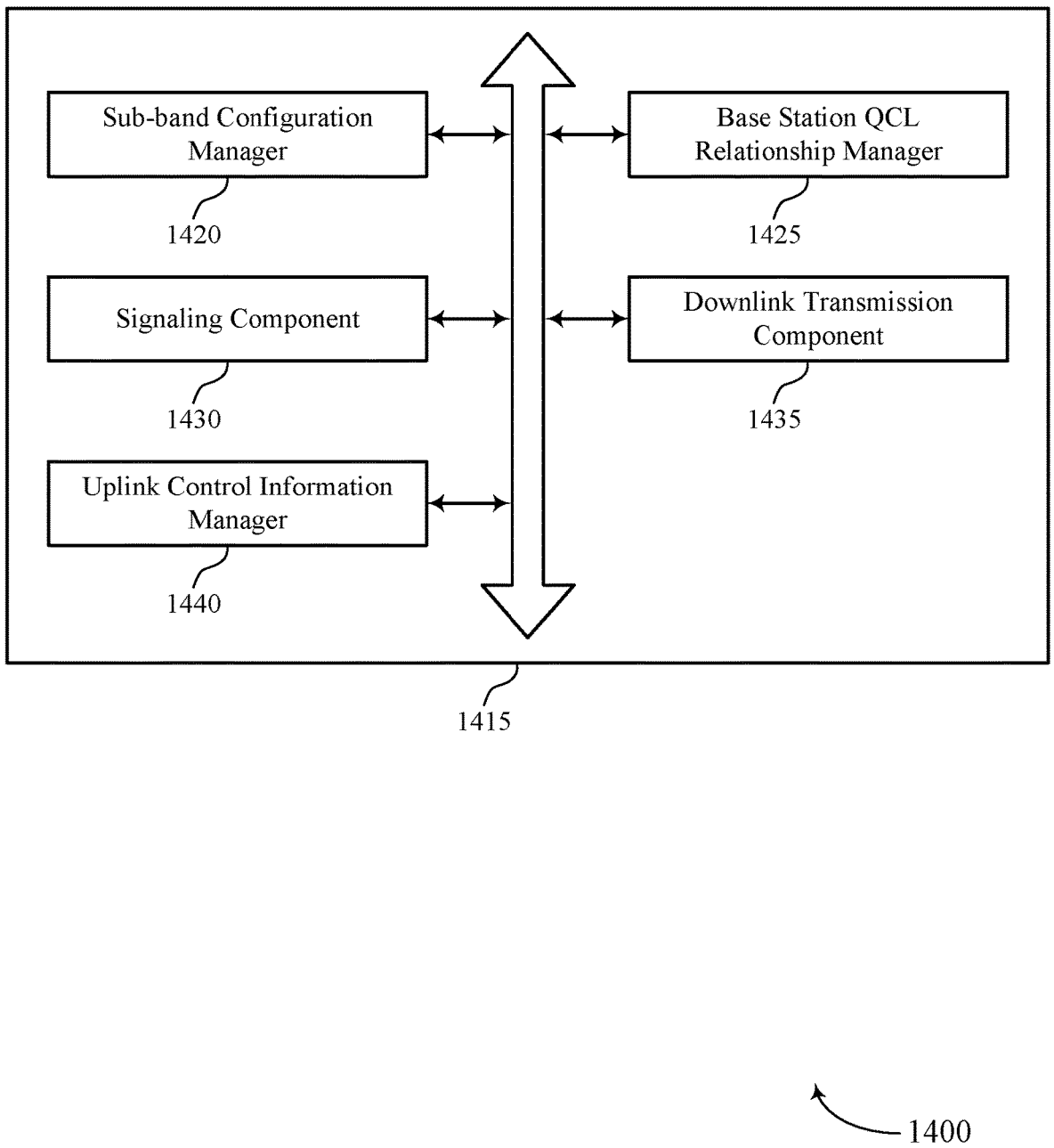

FIG. 14 shows a block diagram 1400 of a base station communications manager 1415 in accordance with aspects of the present disclosure. The base station communications manager 1415 may be an example of aspects of a base station communications manager 1515 described with reference to FIGS. 12, 13, and 15. The base station communications manager 1415 may include sub-band configuration manager 1420, base station QCL relationship manager 1425, signaling component 1430, downlink transmission component 1435, and uplink control information manager 1440. Each of these modules may communicate, directly or indirectly, with one another (e.g., via one or more buses).

Sub-band configuration manager 1420 may configure a first sub-band and a second sub-band of a system bandwidth for communication with a UE 115. In some cases, the first sub-band includes a first carrier and the second sub-band includes a second carrier. Base station QCL relationship manager 1425 may determine a spatial QCL relationship between the first sub-band and the second sub-band. In some cases, determining the spatial QCL relationship between the first sub-band and the second sub-band includes determining a reciprocal QCL relationship across the first sub-band and the second sub-band. The reciprocal QCL relationship may be associated with spatial parameters used for reception, by the UE 115, of one or more downlink signals transmitted on the first sub-band and transmission, by the UE 115, of one or more uplink signals transmitted on the second sub-band. In some cases, the one or more downlink signals include a PDCCH DMRS, a PDSCH DMRS, a CSI-RS, a synchronization signal, or any combination thereof. The one or more uplink signals may include a PUCCH DMRS, a PUSCH DMRS, a SRS, a RACH, or any combination thereof.

In some examples, determining the spatial QCL relationship between the first sub-band and the second sub-band may include determining a QCL relationship across the first sub-band and the second sub-band. The QCL relationship may be associated with spatial parameters for reception by the UE 115 of a first downlink signal transmitted on the first sub-band and reception by the UE 115 of a second downlink signal transmitted on the second sub-band. In such cases, the first downlink signal and the second downlink signal include a PDCCH DMRS, a PDSCH DMRS, a CSI-RS, a synchronization signal, or any combination thereof. In some cases, the spatial QCL relationship is associated with spatial parameters including a pointing angle, a beam width, a beam direction, or a combination thereof.

Signaling component 1430 may transmit signaling to the UE 115 that indicates the determined spatial QCL relationship. In some cases, transmitting the signaling includes: transmitting the signaling using RRC messaging, a medium access control (MAC) CE, DCI, or a combination thereof.

Downlink transmission component 1435 may transmit a downlink transmission to the UE 115 on the first sub-band, where the spatial QCL relationship allows the UE 115 to derive spatial parameters for transmission of uplink control information on the second sub-band based on spatial parameters used for reception of the downlink transmission on the first sub-band. In some examples, downlink transmission component 1435 may transmit a first downlink transmission to the UE 115 on the first sub-band, where the spatial QCL relationship allows the UE 115 to derive spatial parameters for reception of a second downlink transmission on the second sub-band based on spatial parameters used for reception of the first downlink transmission on the first sub-band. In some cases, downlink transmission component 1435 may transmit the second downlink transmission on the second sub-band. In some cases, the first downlink transmission includes a channel CSI-RS and the second downlink transmission includes a PDSCH DMRS. Uplink control information manager 1440 may receive the uplink control information on the second sub-band.

Figure 15:
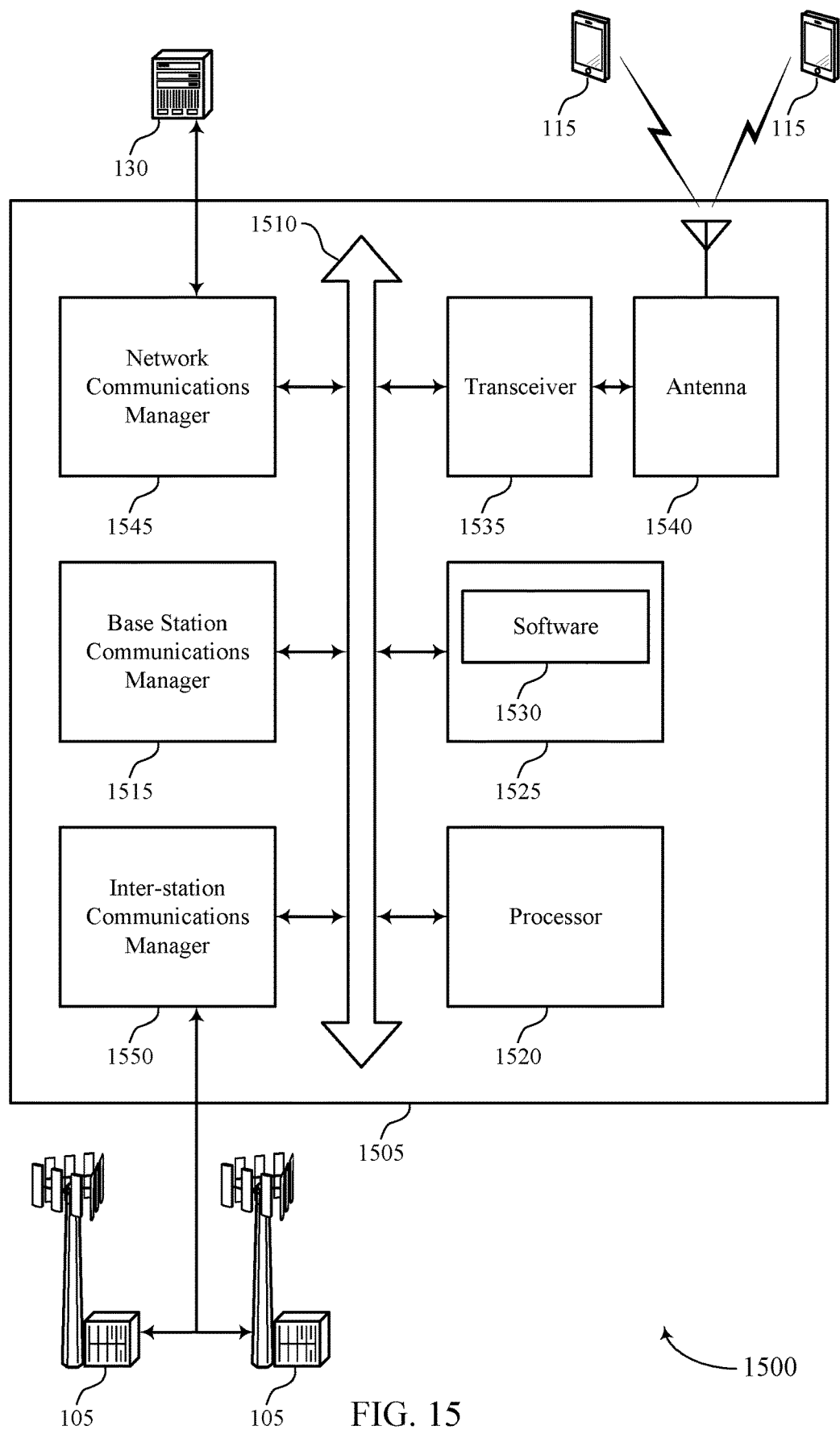
FIG. 15 illustrates a block diagram of a system including a base station in accordance with aspects of the present disclosure.

FIG. 15 shows a diagram of a system 1500 including a device 1505 in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting cross-sub-band quasi co-location signaling).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support cross-sub-band quasi co-location signaling. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions. Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an Long Term Evolution (LTE)/LTE-A wireless communication network technology to provide communication between base stations 105.

Figure 16:
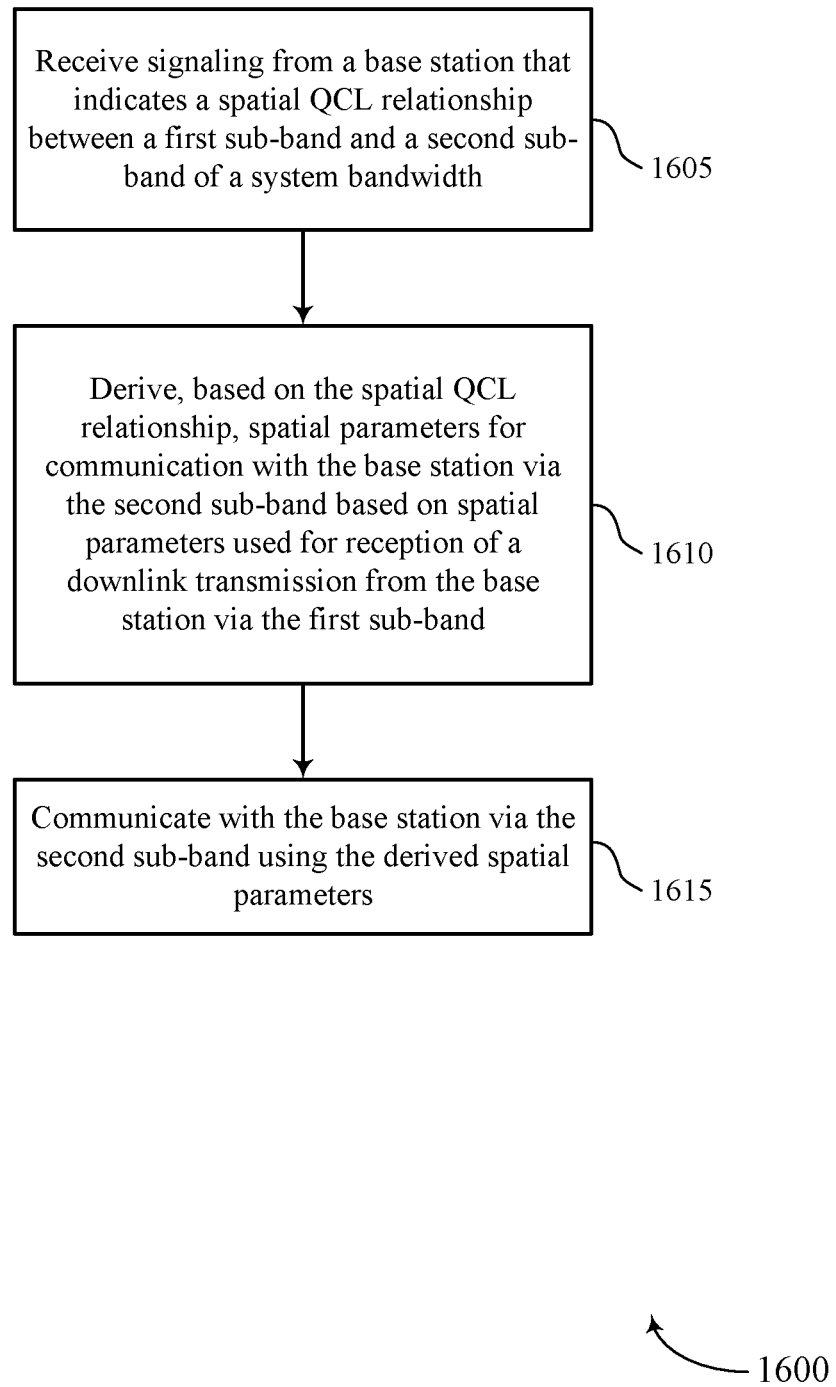
FIGS. 16 through 20 illustrate methods in accordance with aspects of the present disclosure.

FIG. 16 shows a flowchart illustrating a method 1600 in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive signaling from a base station 105 that indicates a spatial QCL relationship between a first sub-band and a second sub-band of a system bandwidth. The operations of 1605 may be performed according to the methods described herein. In certain examples, aspects of the operations of 1605 may be performed by a UE QCL relationship manager as described with reference to FIGS. 8 through 11.

At 1610 the UE 115 may derive, based on the spatial QCL relationship, spatial parameters for communication with the base station 105 via the second sub-band based on spatial parameters used for reception of a downlink transmission from the base station 105 via the first sub-band. The operations of 1610 may be performed according to the methods described herein. In certain examples, aspects of the operations of 1610 may be performed by a spatial parameter manager as described with reference to FIGS. 8 through 11.

At 1615 the UE 115 may communicate with the base station 105 via the second sub-band using the derived spatial parameters. The operations of 1615 may be performed according to the methods described herein. In certain examples, aspects of the operations of 1615 may be performed by a sub-band communications component as described with reference to FIGS. 8 through 11.

Figure 17:
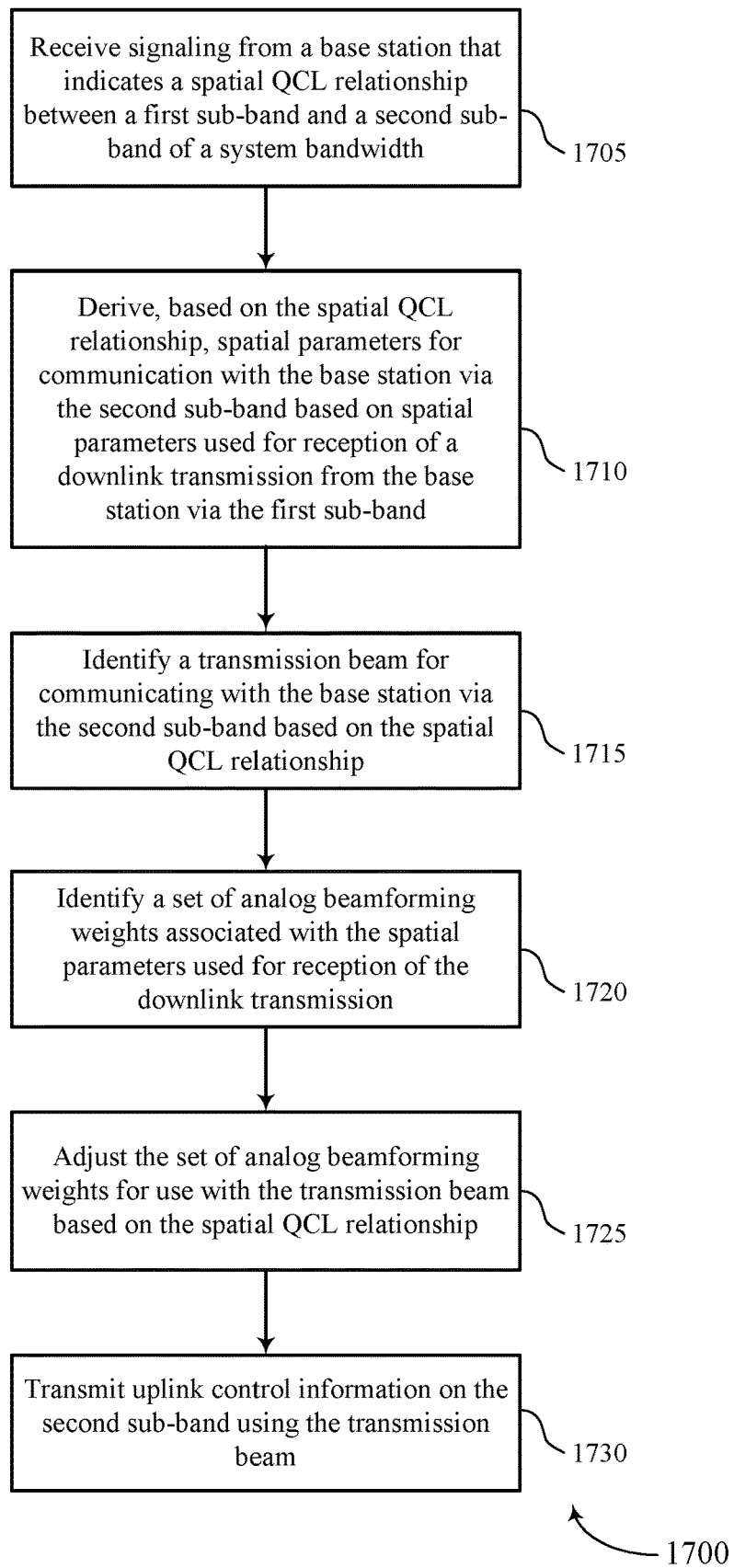

FIG. 17 shows a flowchart illustrating a method 1700 in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive signaling from a base station 105 that indicates a spatial QCL relationship between a first sub-band and a second sub-band of a system bandwidth. The operations of 1705 may be performed according to the methods described herein. In certain examples, aspects of the operations of 1705 may be performed by a UE QCL relationship manager as described with reference to FIGS. 8 through 11.

At 1710 the UE 115 may derive, based on the spatial QCL relationship, spatial parameters for communication with the base station 105 via the second sub-band based on spatial parameters used for reception of a downlink transmission from the base station 105 via the first sub-band. The operations of 1710 may be performed according to the methods described herein. In certain examples, aspects of the operations of 1710 may be performed by a spatial parameter manager as described with reference to FIGS. 8 through 11.

At 1715 the UE 115 may identify a transmission beam for communicating with the base station 105 via the second sub-band based on the spatial QCL relationship. The operations of 1715 may be performed according to the methods described herein. In certain examples, aspects of the operations of 1715 may be performed by a beam manager as described with reference to FIGS. 8 through 11.

At 1720 the UE 115 may identify a set of analog beamforming weights associated with the spatial parameters used for reception of the downlink transmission. The operations of 1720 may be performed according to the methods described herein. In certain examples, aspects of the operations of 1720 may be performed by a beamforming weight manager as described with reference to FIGS. 8 through 11.

At 1725 the UE 115 may adjust the set of analog beamforming weights for use with the transmission beam based on the spatial QCL relationship. The operations of 1725 may be performed according to the methods described herein. In certain examples, aspects of the operations of 1725 may be performed by a beamforming weight manager as described with reference to FIGS. 8 through 11.

At 1730 the UE 115 may communicate with the base station 105 via the second sub-band using the derived spatial parameters, where the communicating includes transmitting uplink control information on the second sub-band using the transmission beam. The operations of 1730 may be performed according to the methods described herein. In certain examples, aspects of the operations of 1730 may be performed by a sub-band communications component as described with reference to FIGS. 8 through 11.

Figure 18:
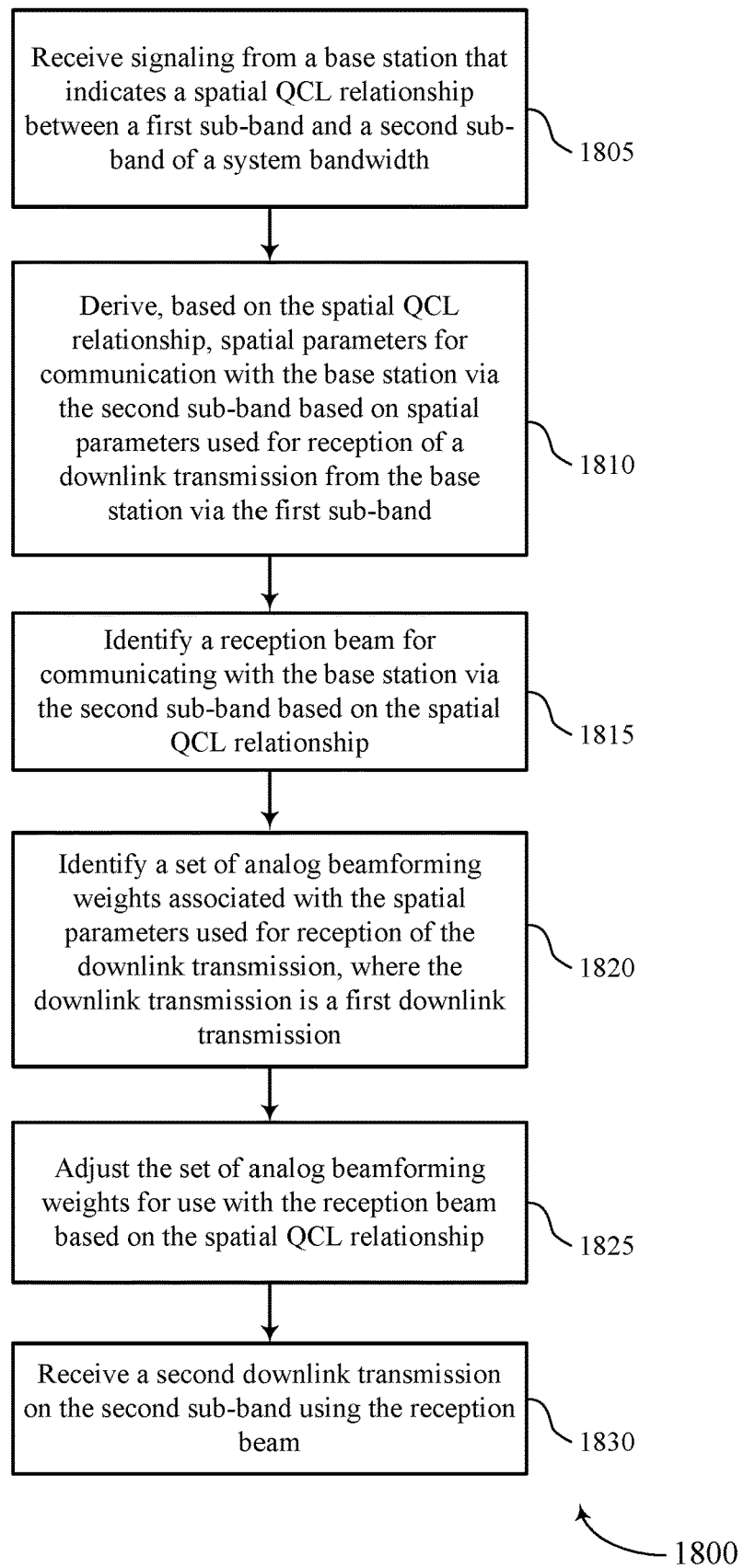

FIG. 18 shows a flowchart illustrating a method 1800 in accordance with aspects of the present disclosure. The operations of method 1800 may be implemented by a UE 115 or its components as described herein. For example, the operations of method 1800 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may receive signaling from a base station 105 that indicates a spatial QCL relationship between a first sub-band and a second sub-band of a system bandwidth. The operations of 1805 may be performed according to the methods described herein. In certain examples, aspects of the operations of 1805 may be performed by a UE QCL relationship manager as described with reference to FIGS. 8 through 11.

At 1810 the UE 115 may derive, based on the spatial QCL relationship, spatial parameters for communication with the base station 105 via the second sub-band based on spatial parameters used for reception of a downlink transmission from the base station 105 via the first sub-band. The operations of 1810 may be performed according to the methods described herein. In certain examples, aspects of the operations of 1810 may be performed by a spatial parameter manager as described with reference to FIGS. 8 through 11.

At 1815 the UE 115 may identify a reception beam for communicating with the base station 105 via the second sub-band based on the spatial QCL relationship. The operations of 1815 may be performed according to the methods described herein. In certain examples, aspects of the operations of 1815 may be performed by a beam manager as described with reference to FIGS. 8 through 11.

At 1820 the UE 115 may identify a set of analog beamforming weights associated with the spatial parameters used for reception of the downlink transmission, where the downlink transmission is a first downlink transmission. The operations of 1820 may be performed according to the methods described herein. In certain examples, aspects of the operations of 1820 may be performed by a beamforming weight manager as described with reference to FIGS. 8 through 11.

At 1825 the UE 115 may adjust the set of analog beamforming weights for use with the reception beam based on the spatial QCL relationship. The operations of 1825 may be performed according to the methods described herein. In certain examples, aspects of the operations of 1825 may be performed by a beamforming weight manager as described with reference to FIGS. 8 through 11.

At 1830 the UE 115 may communicate with the base station 105 via the second sub-band using the derived spatial parameters, where the communicating includes receiving a second downlink transmission on the second sub-band using the reception beam. The operations of 1830 may be performed according to the methods described herein. In certain examples, aspects of the operations of 1830 may be performed by a sub-band communications component as described with reference to FIGS. 8 through 11.

Figure 19:
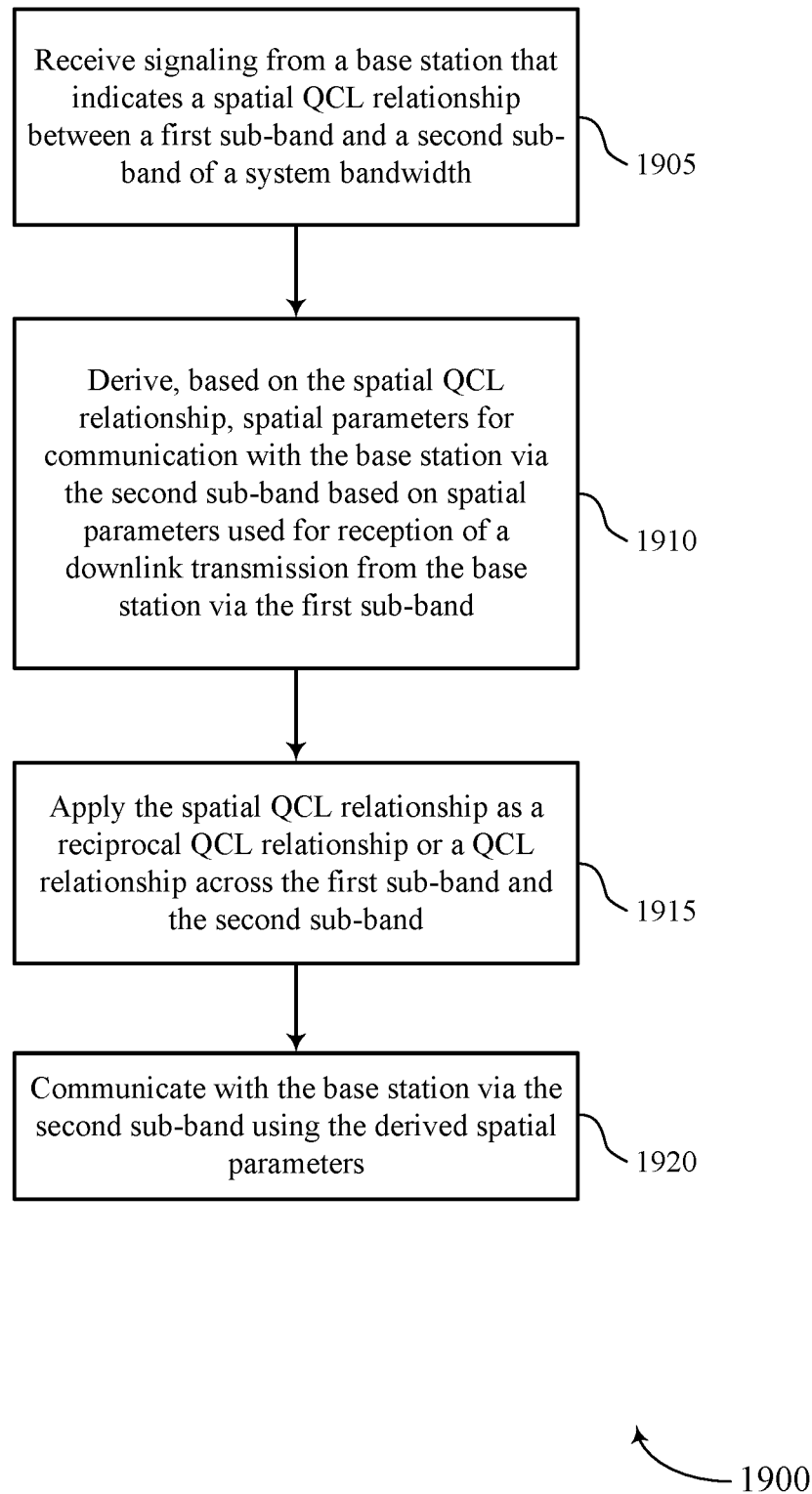

FIG. 19 shows a flowchart illustrating a method 1900 in accordance with aspects of the present disclosure. The operations of method 1900 may be implemented by a UE 115 or its components as described herein. For example, the operations of method 1900 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may receive signaling from a base station 105 that indicates a spatial QCL relationship between a first sub-band and a second sub-band of a system bandwidth. The operations of 1905 may be performed according to the methods described herein. In certain examples, aspects of the operations of 1905 may be performed by a UE QCL relationship manager as described with reference to FIGS. 8 through 11.

At 1910 the UE 115 may derive, based on the spatial QCL relationship, spatial parameters for communication with the base station 105 via the second sub-band based on spatial parameters used for reception of a downlink transmission from the base station 105 via the first sub-band. The operations of 1910 may be performed according to the methods described herein. In certain examples, aspects of the operations of 1910 may be performed by a spatial parameter manager as described with reference to FIGS. 8 through 11.

At 1915 the UE 115 may apply the spatial QCL relationship as a reciprocal QCL relationship across the first sub-band and the second sub-band, where the reciprocal QCL relationship is associated with spatial parameters used for reception of one or more downlink signals received via the downlink transmission on the first sub-band and transmission of one or more uplink signals transmitted on the second sub-band. Additionally or alternatively, the UE 115 may apply the spatial QCL relationship as a QCL relationship across the first sub-band and the second sub-band, where the QCL relationship is associated with spatial parameters used for reception of a first downlink signal received via the downlink transmission on the first sub-band and reception of a second downlink signal received on the second sub-band. The operations of 1915 may be performed according to the methods described herein. In certain examples, aspects of the operations of 1915 may be performed by a UE QCL relationship manager as described with reference to FIGS. 8 through 11.

At 1920 the UE 115 may communicate with the base station 105 via the second sub-band using the derived spatial parameters. The operations of 1920 may be performed according to the methods described herein. In certain examples, aspects of the operations of 1920 may be performed by a sub-band communications component as described with reference to FIGS. 8 through 11.

Figure 20:
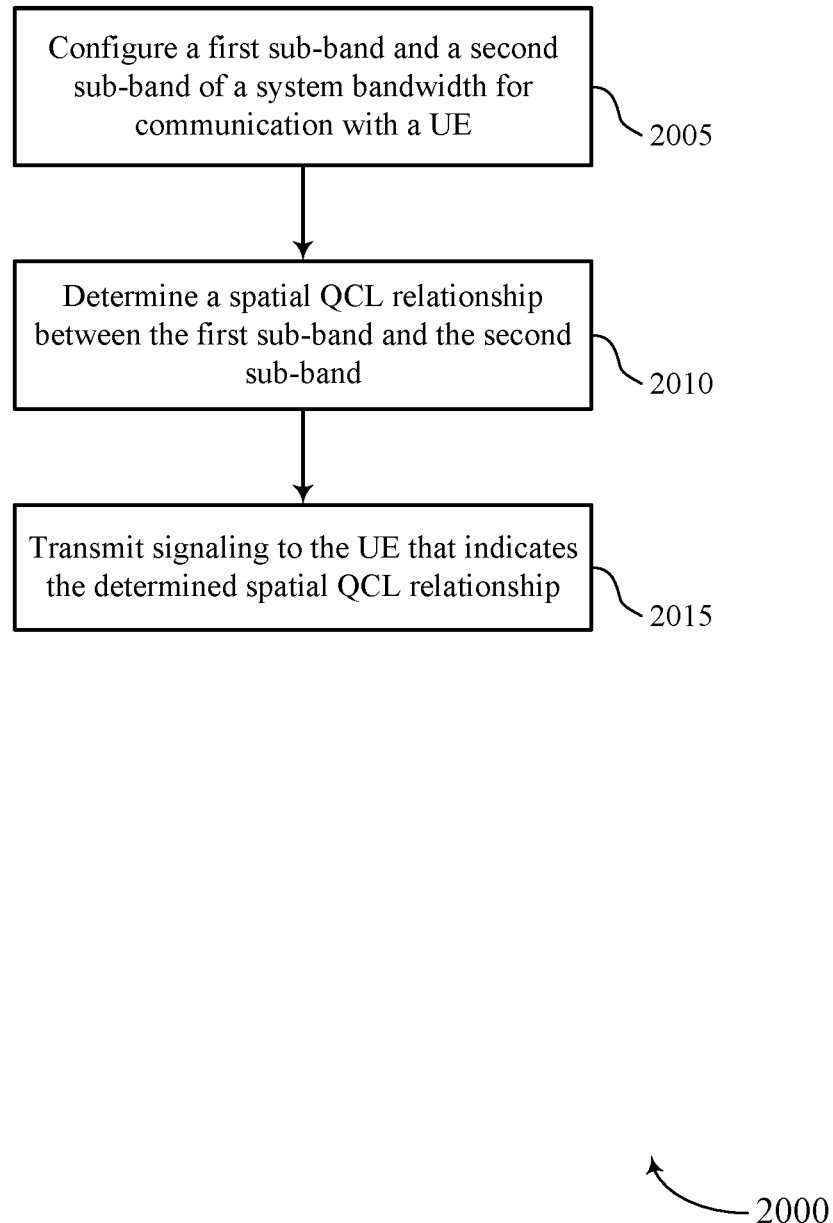

FIG. 20 shows a flowchart illustrating a method 2000 in accordance with aspects of the present disclosure. The operations of method 2000 may be implemented by a base station 105 or its components as described herein. For example, the operations of method 2000 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 2005 the base station 105 may configure a first sub-band and a second sub-band of a system bandwidth for communication with a UE 115. The operations of 2005 may be performed according to the methods described herein. In certain examples, aspects of the operations of 2005 may be performed by a sub-band configuration manager as described with reference to FIGS. 12 through 15.

At 2010 the base station 105 may determine a spatial QCL relationship between the first sub-band and the second sub-band. The operations of 2010 may be performed according to the methods described herein. In certain examples, aspects of the operations of 2010 may be performed by a base station QCL relationship manager as described with reference to FIGS. 12 through 15.

At 2015 the base station 105 may transmit signaling to the UE 115 that indicates the determined spatial QCL relationship. The operations of 2015 may be performed according to the methods described herein. In certain examples, aspects of the operations of 2015 may be performed by a signaling component as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of those. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving signaling from a base station that indicates a spatial quasi co-location (QCL) relationship between a first downlink signal associated with a first sub-band and a second downlink signal associated with a second sub-band of a system bandwidth, wherein the first sub-band is different from the second sub-band and wherein the first sub-band comprises a first bandwidth part and the second sub-band comprises a second bandwidth part;
    deriving, based at least in part on the spatial QCL relationship, the first sub-band being different from the second sub-band, and spatial parameters used for reception of a downlink transmission from the base station via the first sub-band, spatial parameters for communication of a signal with the base station via the second sub-band; and
    communicating with the base station via the second sub-band using the derived spatial parameters.

2. The method of claim 1, further comprising:
    identifying a transmission beam for communicating with the base station via the second sub-band based on the spatial QCL relationship,
    wherein the communicating comprises: transmitting uplink control information on the second sub-band using the transmission beam.

3. The method of claim 2, wherein deriving the spatial parameters comprises:
    deriving spatial parameters for the transmission beam, the derived spatial parameters being for functions that are reciprocal of functions defined by the spatial parameters used for reception of the downlink transmission.

4. The method of claim 2, further comprising:
    identifying a set of analog beamforming weights associated with the spatial parameters used for reception of the downlink transmission; and
    adjusting the set of analog beamforming weights for use with the transmission based at least in part on the spatial QCL relationship.

5. The method of claim 1, further comprising:
    identifying a reception beam for receiving the signal from the base station via the second sub-band based on the spatial QCL relationship, wherein the communicating comprises:

receiving the signal on the second sub-band using the reception beam.

6. The method of claim 5, further comprising:
identifying a set of analog beamforming weights associated with the spatial parameters used for reception of the downlink transmission, wherein the downlink transmission is a first downlink transmission; and
adjusting the set of analog beamforming weights for use with the reception beam based at least in part on the spatial QCL relationship.

7. The method of claim 1, further comprising:
applying the spatial QCL relationship as a reciprocal QCL relationship across the first sub-band and the second sub-band, wherein the reciprocal QCL relationship is associated with spatial parameters used for reception of one or more downlink signals received via the downlink transmission on the first sub-band and transmission of one or more uplink signals transmitted on the second sub-band.

8. The method of claim 1, further comprising:
applying the spatial QCL relationship as a QCL relationship across the first sub-band and the second sub-band, wherein the QCL relationship is associated with spatial parameters used for reception of the first downlink signal received via the downlink transmission on the first sub-band and reception of the second downlink signal received on the second sub-band.

9. The method of claim 1, wherein the signal comprises a demodulation reference signal (DMRS).

10. The method of claim 1, wherein the signal comprises a physical downlink control channel (PDCCH) DMRS.

11. The method of claim 1, wherein the signal comprises a channel state information reference signal (CSI-RS).

12. The method of claim 1, wherein the signal comprises a sounding reference signal (SRS).

13. The method of claim 1, wherein the signal comprises a synchronization signal (SS).

14. The method of claim 1, wherein the signal comprises a random access channel (RACH) transmission.

15. A method for wireless communication at a base station, comprising:
configuring a first sub-band and a second sub-band of a system bandwidth for communication with a user equipment (UE), wherein the first sub-band is different from the second sub-band;
determining a spatial quasi co-location (QCL) relationship between a first downlink signal associated with the first sub-band and a second downlink signal associated with the second sub-band;
transmitting signaling to the UE that indicates the determined spatial QCL relationship;
transmitting a downlink transmission to the UE on the first sub-band in order to facilitate derivation, based at least in part on the determined spatial QCL relationship, the first sub-band being different from the second sub-band, and spatial parameters used for reception of a downlink transmission from the base station via the first sub-band, of spatial parameters for communication of a signal with the UE via the second sub-band.

16. The method of claim 15, wherein the spatial QCL relationship allows the UE to derive spatial parameters for transmission of uplink control information on the second sub-band based at least in part on spatial parameters used for reception of the downlink transmission on the first sub-band, the method further comprising:
receiving the uplink control information on the second sub-band.

17. The method of claim 15, wherein determining the spatial QCL relationship between the first downlink signal associated with the first sub-band and the second downlink signal associated with the second sub-band:
determining a reciprocal QCL relationship across the first sub-band and the second sub-band, wherein the reciprocal QCL relationship is associated with spatial parameters used for reception, by the UE, of one or more downlink signals transmitted on the first sub-band and transmission, by the UE, of one or more uplink signals transmitted on the second sub-band.

18. The method of claim 15, wherein determining the spatial QCL relationship between the first downlink signal associated with the first sub-band and the second downlink signal associated with the second sub-band:
determining a QCL relationship across the first sub-band and the second sub-band, wherein the QCL relationship is associated with spatial parameters for reception by the UE of the first downlink signal transmitted on the first sub-band and reception by the UE of the second downlink signal transmitted on the second sub-band.

19. The method of claim 15, wherein the spatial parameters are for reception of the signal from the base station.

20. The method of claim 15, wherein the signal comprises a demodulation reference signal (DMRS).

21. The method of claim 15, wherein the signal comprises a physical downlink control channel (PDCCH) DMRS.

22. The method of claim 15, wherein the signal comprises a channel state information reference signal (CSI-RS).

23. The method of claim 15, wherein the signal comprises a sounding reference signal (SRS).

24. The method of claim 15, wherein the signal comprises a synchronization signal.

25. The method of claim 15, wherein the signal comprises a random access channel (RACH) transmission.

26. The method of claim 15, wherein the first sub-band comprises a first bandwidth part and the second sub-band comprises a second bandwidth part.

27. An apparatus for wireless communication at a user equipment (UE), comprising:
a processor;
memory in electronic communication with the processor; and
instructions stored in the memory and operable, when executed by the processor, to cause the apparatus to:
receive signaling from a base station that indicates a spatial quasi co-location (QCL) relationship between a first downlink signal associated with a first sub-band and a second downlink signal associated with a second sub-band of a system bandwidth, wherein the first sub-band is different from the second sub-band and wherein the first sub-band comprises a first bandwidth part and the second sub-band comprises a second bandwidth part;
derive, based at least in part on the spatial QCL relationship, the first sub-band being different from the second sub-band, and spatial parameters used for reception of a downlink transmission from the base station via the first sub-band, spatial parameters for communication of a signal with the base station via the second sub-band; and
communicate with the base station via the second sub-band using the derived spatial parameters.

28. The apparatus of claim 27, wherein the instructions are further operable by the processor to cause the apparatus to:

identify a transmission beam for communicating with the base station via the second sub-band based on the spatial QCL relationship, wherein the communication with the base station via the second sub-band using the derived spatial parameters is a transmission of uplink control information on the second sub-band using the transmission beam.

29. An apparatus for wireless communication at a base station, comprising:

a processor;

memory in electronic communication with the processor; and instructions stored in the memory and operable, when executed by the processor, to cause the apparatus to:

configure a first sub-band and a second sub-band of a system bandwidth for communication with a user equipment (UE), wherein the first sub-band is different from the second sub-band;

determine a spatial quasi co-location (QCL) relationship between a first downlink signal associated with the first sub-band and a second downlink signal associated with the second sub-band;

transmit signaling to the UE that indicates the determined spatial QCL relationship; and transmit a downlink transmission to the UE on the first sub-band in order to facilitate derivation, based at least in part on the determined spatial QCL relationship, the first sub-band being different from the second sub-band, and spatial parameters used for reception of a downlink transmission from the base station via the first sub-band, of spatial parameters for communication of a signal with the UE via the second sub-band.

* * * * *